(12) United States Patent
Narita

(10) Patent No.: US 8,786,754 B2
(45) Date of Patent: Jul. 22, 2014

(54) INFORMATION PROCESSING APPARATUS, METHOD, AND COMPUTER-READABLE STORAGE MEDIUM FOR CONTROLLING CAPTURED IMAGE DISPLAY

(75) Inventor: Tomoya Narita, Kanagawa (JP)

(73) Assignee: Sony Corporation, Tokyo (JP)

(*) Notice: Subject to any disclaimer, the term of this patent is extended or adjusted under 35 U.S.C. 154(b) by 339 days.

(21) Appl. No.: 12/897,939

(22) Filed: Oct. 5, 2010

(65) Prior Publication Data
US 2011/0090390 A1 Apr. 21, 2011

(30) Foreign Application Priority Data
Oct. 15, 2009 (JP) ................. P2009-238467

(51) Int. Cl.
*H04N 5/225* (2006.01)
*H04N 5/232* (2006.01)

(52) U.S. Cl.
CPC ....... *H04N 5/23293* (2013.01); *H04N 5/23216* (2013.01)
USPC .................................................. 348/333.12

(58) Field of Classification Search
CPC .............. H04N 5/23293; H04N 5/232; H04N 5/23216; G01S 3/7864; G01S 3/7865; G06K 9/00234; G06K 9/00; G06K 9/2054; G06K 2209/01; A61B 6/102
USPC ........ 348/169, 170, 171, 172, 333.03, 333.12
See application file for complete search history.

(56) References Cited

U.S. PATENT DOCUMENTS

| | | | | |
|---|---|---|---|---|
| 6,806,906 B1* | 10/2004 | Soga et al. | ............... | 348/333.03 |
| 7,720,369 B2* | 5/2010 | Nose | ........................ | 348/240.99 |
| 2001/0048815 A1* | 12/2001 | Nakajima et al. | ............. | 396/310 |
| 2004/0189849 A1* | 9/2004 | Hofer | ........................ | 348/333.03 |
| 2005/0088542 A1* | 4/2005 | Stavely et al. | ........... | 348/333.11 |
| 2005/0179791 A1* | 8/2005 | Iga | .............................. | 348/231.6 |
| 2006/0158534 A1* | 7/2006 | Gotohda | ....................... | 348/239 |
| 2007/0025723 A1* | 2/2007 | Baudisch et al. | ............. | 396/287 |
| 2008/0239086 A1* | 10/2008 | Nakamura | ................. | 348/222.1 |
| 2008/0239104 A1* | 10/2008 | Koh | ........................... | 348/222.1 |
| 2009/0322893 A1* | 12/2009 | Stallings et al. | ........... | 348/222.1 |
| 2010/0026872 A1* | 2/2010 | Jiang | ........................ | 348/333.03 |
| 2010/0110266 A1* | 5/2010 | Lee et al. | ................. | 348/333.02 |
| 2010/0231741 A1* | 9/2010 | Suzuki | ....................... | 348/222.1 |
| 2010/0277614 A1* | 11/2010 | Chiu | ........................ | 348/333.11 |
| 2011/0187882 A1* | 8/2011 | Kim et al. | ................... | 348/222.1 |
| 2012/0062768 A1* | 3/2012 | Arai | .............................. | 348/239 |

FOREIGN PATENT DOCUMENTS

| JP | 2001-167253 | | 6/2001 | |
| JP | 2006222690 A | * | 8/2006 | ............ H04N 5/225 |
| JP | 2007-158868 | | 6/2007 | |

* cited by examiner

*Primary Examiner* — Aung S Moe
(74) *Attorney, Agent, or Firm* — Sherr & Jiang, PLLC

(57) ABSTRACT

An information processing apparatus includes a captured image acquisition unit, a recommended composition acquisition unit, and a control unit. The captured image acquisition unit acquires captured image data, a subject recognition unit that recognizes a subject of a captured image based on the captured image data. The recommended composition acquisition unit acquires recommended composition data representing a recommended composition of the subject. The control unit allows a display unit to display a display screen including the captured image, a frame representing the subject, and information about the recommended composition, changes the display of the frame when the composition of the captured image is similar to the recommended composition, and fixes and displays the frame being changed in display.

15 Claims, 14 Drawing Sheets

INFORMATION PROCESSING APPARATUS, METHOD, AND COMPUTER-READABLE STORAGE MEDIUM FOR CONTROLLING CAPTURED IMAGE DISPLAY

BACKGROUND OF THE INVENTION

1. Field of the Invention

The present invention relates to an information processing apparatus, a display control method, and a display control program, for example those suitably applicable to the presentation of a recommended composition of a captured image.

2. Description of the Related Art

In recent years, there is proposed an image pickup apparatus, such as a digital still camera (hereinafter, also referred to as a DSC), capable of presenting the user a photographic composition recommended for shooting (hereinafter, also referred to as a recommended composition). A proposed example of such an image pickup apparatus is one that displays a recommended composition frame representing a recommended composition on a captured image (see, Japanese Unexamined Patent Application Publication No. 2007-158868, particularly FIG. 9).

SUMMARY OF THE INVENTION

By the way, in the aforementioned image pickup apparatus, the user performs pan, tilt, zoom, rotation, or the like while confirming a recommended composition frame displayed on a captured image to fit the composition of the captured image to the recommended composition.

However, various operations with a lot of flexibilities carried out by the user may cause a blurred composition of the photo due to the shaking of the image pickup apparatus. Therefore, it is not easy to fit the composition of the captured image to the recommended composition.

Furthermore, if the composition of the captured image is blurred in this way, the recommended composition frame displayed on the captured image is moved. Thus, the user may feel that the composition of the captured image can be hardly matched with the recommended composition.

In other words, in the aforementioned image pickup apparatus, the user's operation for fitting the composition of a captured image to a recommended configuration imposes a burden on the user.

Disclosed herein are one or more inventions that provide an information processing apparatus, a display control method, and a display control program, where the burden on the user in the user's operation for matching the composition of a captured image with the recommended configuration thereof can be reduced.

According to one embodiment of the present invention, an information processing apparatus includes: a captured image acquisition unit that acquires captured image data; a subject recognition unit that recognizes a subject of a captured image based on the captured image data; a recommended composition acquisition unit that acquires recommended composition data representing a recommended composition of the subject; and a control unit that allows a display unit to display a display screen including the captured image, a frame representing the subject, and information about the recommended composition, changes the display of the frame when the composition of the captured image is similar to the recommended composition, and fixes and displays the frame being changed in display.

Therefore, the above apparatus can present the user the recommended composition. In addition, even if the composition of the captured image is slightly moved, the user can recognize that the composition of the captured image corresponds to the recommended composition as long as the composition of the captured image is similar to the recommended composition. Therefore, the above apparatus can reduce a difficulty of the user's operation for fitting the composition of the captured image to the recommended composition and make the user difficult to feel that the composition of the captured image hardly fit to the recommended composition.

According to any embodiment of the present invention, even if the composition of the captured image is slightly moved, the user can recognize that the composition of the captured image corresponds to the recommended composition as long as the composition of the captured image is similar to the recommended composition. Therefore, the above apparatus can reduce a difficulty of the user's operation for fitting the composition of the captured image to the recommended composition and make the user difficult to feel that the composition of the captured image hardly fit to the recommended composition. Therefore, the embodiments of the present invention realize an information processing apparatus, a display control method, and a display control program, where the burden on the user in the user's operation for matching the composition of a captured image with the recommended configuration thereof can be reduced.

DESCRIPTION OF THE PREFERRED EMBODIMENTS

Hereinafter, the best mode for carrying out the present invention will be described as embodiments thereof. Explanation is given in following order:

1. Embodiment
2. Other Embodiments

1. Embodiment

1-1. Outline of Embodiment

First, the outline of an embodiment will be described. After the description of the outline, the specific example of the embodiment will be described.

Figure 1:
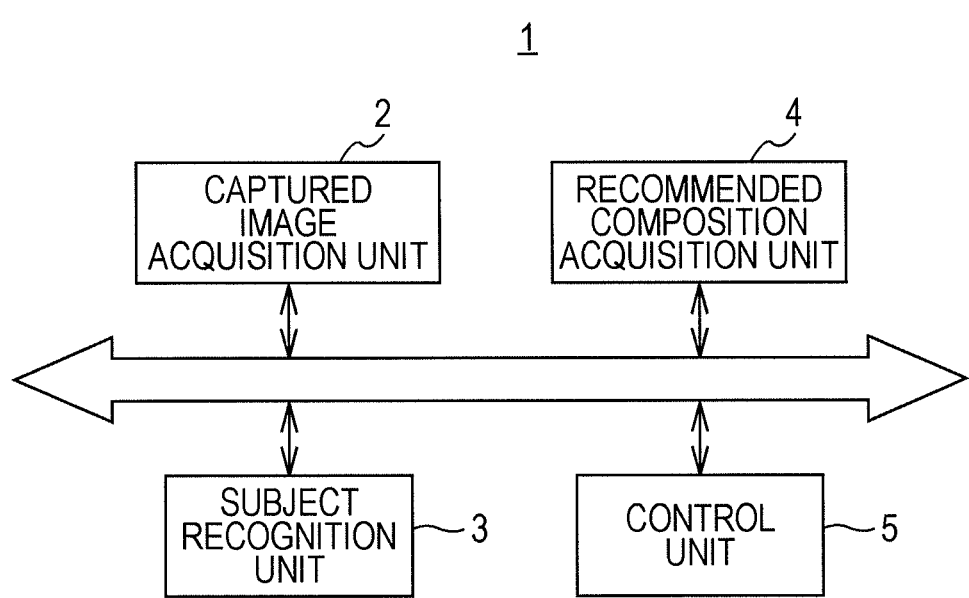
FIG. 1 is a functional block diagram illustrating the configuration of an information processing apparatus in the outline of an embodiment.

Referring now to FIG. 1, reference numeral 1 denotes an information processing apparatus. The information processing apparatus 1 includes a captured image acquisition unit 2 that acquires captured image data. The information processing apparatus 1 also includes a subject recognition unit 3 that recognizes a photographic subject (hereinafter, also simply referred to as a subject) in a captured image based on the captured image data.

Furthermore, the information processing apparatus 1 includes a recommended composition acquisition unit 4 that acquires recommended composition data representing the recommended composition of the subject. Furthermore, the information processing apparatus 1 includes a control unit 5 that allows a display unit (not shown) to display a display screen with a captured image, a subject-representing frame, and information about a recommended composition. When the composition of the captured image is similar to the recommended composition, the control unit 5 causes a change in display of the frame and then fixes and displays the changed display of the frame.

The above configuration of the information processing apparatus 1 allows the user to present the recommended composition. In addition, even if the composition of the captured image is slightly moved, the user can recognize that the composition of the captured image is fit to the recommended composition as long as the composition of the captured image is similar to the recommended composition. Therefore, the information processing apparatus 1 can reduce a difficulty of the user's operation for fitting the composition of the captured image to the recommended composition and make the user difficult to feel that the composition of the captured image hardly fit to the recommended composition.

Hereinafter, the specific example of the information processing apparatus 1 having such a configuration will be described in detail.

1-2. External Configuration of Digital Still Camera (DSC)

Figure 2A:
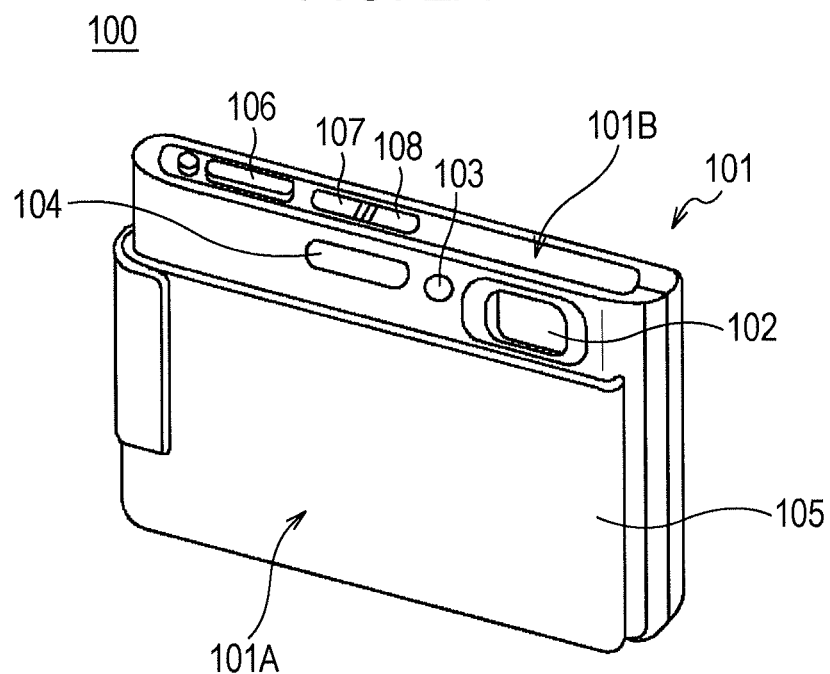
FIG. 2 is a schematic diagram illustrating an external configuration of a digital still camera (DSC)
Figure 2B:
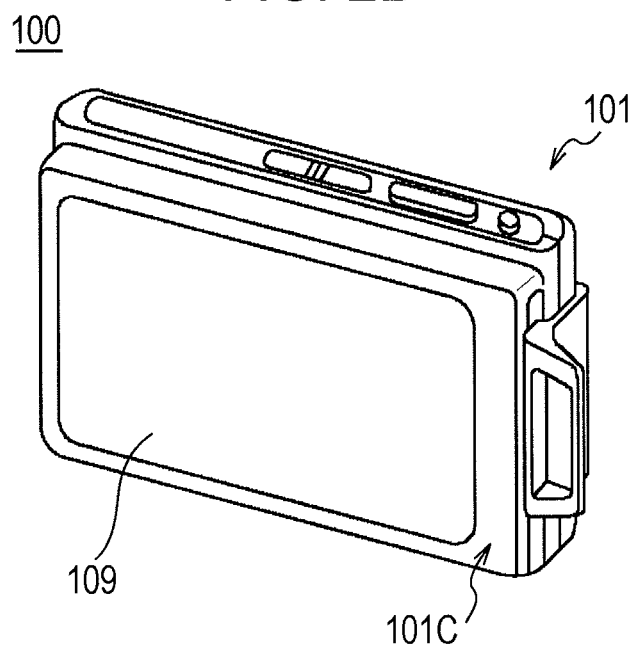

Referring next to FIG. 2A and FIG. 2B, the external configuration of a digital still camera (hereinafter, also referred to as DSC) 100, one specific example of the aforementioned information processing apparatus 1, will be described.

The DSC 100 has a case 101 in the form of a generally flat square shape with certain dimensions enough to be held in the user's one hand. The DSC 100 includes a photographic lens 102, an auto focus (AF) illuminator 103, and a flash 104, which are arranged on the upper portion of the front side 101A of the case 101. Here, the AF illuminator 103 also serves as a self-timer lamp.

Furthermore, a lens cover 105 which can be slid up and down is attached to the front side 101A.

If the lens cover 105 is slid downward, the photographic lens 102, the AF illuminator 103, and the flash 104 are exposed. If the lens cover 105 is slid upward, it covers these components to protect them.

Here, the DSC 100 can be automatically switched on when the lens cover 105 is slid downward.

In addition, a shutter button 100, a replay button 107, and a power button 108 on the upper side 101B of the case 101. Furthermore, a touch screen 109 is formed on the back side 101C of the case 101.

The replay button 107 is a hardware key for switching the operation mode of the DSC 100 to a replay mode for displaying a captured image on the touch screen 109. The touch screen 109 is a display device in which the user is allowed to perform a touch operation with his or her finger or with a stylus pen or the like.

If the lens cover 105 is slid downward or the power button 108 is pressed, the power is turned on to start the DSC 100 in imaging mode.

Then the DSC 100 displays an image shot by the photographic lens 102 as a through-the-lens image on the touch screen 109. Subsequently, the image is recorded when the shutter button 106 is pressed.

Furthermore, if the replay button 107 is pressed, the operation mode of the DSC 100 is switched to the replay mode. Then the DSC100 displays, for example, one of the recorded images on the touch screen 109. Subsequently, the DSC 100 changes an image displayed on the touch screen 109 in response to touch on the touch screen 109.

1-3. Hardware Configuration of Digital Still Camera (DSC)

Figure 3:
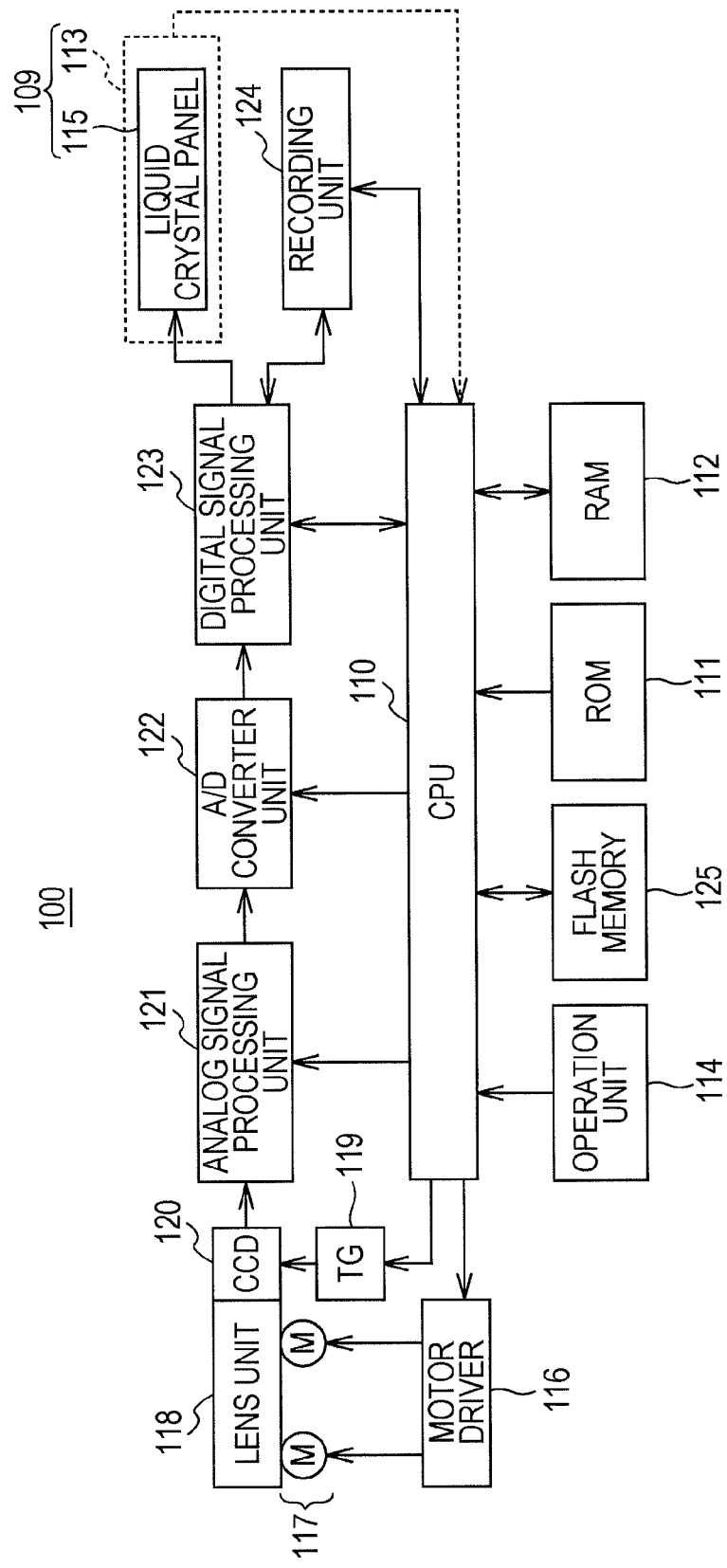
FIG. 3 is a block diagram illustrating a hardware configuration of a digital still camera (DSC)

Referring next to FIG. 3, the hardware configuration of the DSC 100 will be described. In the DSC 100, CPU 110 carries out various kinds of processing by executing programs written in ROM 111 after loading the programs from the ROM 111 to the RAM 112. Also, the CPU 110 controls the respective parts of the DSC 100 in response to signals from a touch panel 113 and an operation unit 114. Here, the term "CPU" used herein is the abbreviation for "Central processing unit". Also, the terms "ROM" used herein is the abbreviations for "Read Only Memory" and the terms "RAM" used herein is the abbreviations for "Random Access Memory".

The touch panel 113 is a device in the touch screen 109 with a liquid crystal panel 115. When the user's finger touches on any position on the touch panel 113, the coordinates of the position touched by the finger (namely, touch position) are detected by the touch panel 113. Then the touch panel 113 sends an input signal to the CPU 110, where the input signal represents the coordinates of the touch position.

When the CPU 110 acquires the coordinates of the touch position from the input signal sent from the touch panel 113, the coordinates are converted into the screen coordinates of the liquid crystal 115 to recognize which position is touched on the screen of the liquid crystal panel 115.

Furthermore, the CPU 110 converts the coordinates of the position acquired by each of input signals sent at regular time intervals into the screen coordinates of the desired panel 115 in sequence to recognize where the touch position moves (or the path of the touch positions).

Furthermore, the CPU 110 determines what kinds of the touch operation have been carried out on which position on the screen with reference to the recognized touch positions and the path thereof.

The operation unit 114 is a device that includes the aforementioned shutter button 106, power button 107, and power button 108 and sends a signal in response to the operation of any of these buttons to the CPU 110.

The CPU 110 determines which button among the shutter button 106, the replay button 107, and the power button 108 has been operated according to the signal sent from the operation unit 114.

In fact, when the user pushes the power button 108 of the operation unit 114 to turn on power or the user performs the touch operation on the touch panel 113 to instruct the switching from the operation mode to the imaging mode, the CPU 110 starts to operate in imaging mode.

At this time, the CPU 110 controls the motor driver 116 to start the actuator 117. Then, the actuator 117 exposes the lens unit 118 including the photographic lens 102 and the AF illuminator 103 from the case 101 of the DSC 100. In addition, the CPU 110 starts the actuator 117 to adjust the aperture of the lens unit 118, change the zoom factor of the optical zoom, or move the focus lens.

At this time, furthermore, the CPU 110 controls a timing generator 119 to supply a timing signal to an imaging device 120, such as a charge coupled device CCD. The imaging device 120 converts the light from the subject, which is incorporated through the lens unit 118, into an electrical signal (i.e., photoelectric conversion), followed by sending the electrical signal to an analog signal processing unit 121.

The analog signal processing unit 121 performs analog-signal processing (e.g., an amplification process) on the electrical signal under the control of the CPU 110 to obtain an analog image signal, followed by sending the analog image signal to an analog/digital converter unit (also referred to as an A/D converter unit) 122.

The A/D converter unit 122 performs analog-digital conversion (A/D conversion) on the analog image signal sent from the analog signal processing unit 121 under the control of the CPU 110 to obtain a digital image signal, followed by sending the digital signal processing unit 123.

The digital signal processing unit 123 performs digital-signal processing (e.g., a de-noising process) on the digital signal sent from the A/D converter unit 122 under the control of the CPU 110, followed by sending the resulting signal to the liquid crystal. As a result, the image of the subject is displayed on the liquid crystal panel 115 as a through-the-lens image. Thus, the DSC100 allows a photographer to check the photographic subject.

At this time, furthermore, the digital signal processing unit 123 generates a graphic signal, such as a character or an icon, and superposes the graphic signal on the digital image signal. As a result, the liquid panel 115 can display the through-the-lens image with one or more of characters and icons.

Here, if the shutter button 106 of the operation unit 114 is half-pressed, then the CPU 110 recognizes that setup for shooting has been performed and the user is going to take a picture.

At this time, the CPU 110 controls the digital signal processor 123 to analyze the received digital image signal and perform a process of recognizing the subject from the image based on the digital image signal (this process is also referred as subject recognition). Incidentally, any of various methods may be employed for recognizing the subject from the image. For example, it may be a method of recognizing the face of a person as a subject by detecting the skin tone of the subject. Alternatively, it may be a method of recognizing a subject by detecting the difference between the brightness of the subject and the brightness of the periphery thereof.

To the CPU 110, the digital signal processing unit 123 returns recognition information about the subject, such as the position, size, and shape of the subject, as a result of the subject recognition process to.

The CPU 110 detects the recommended composition of the subject (simply referred to as a recommended composition) based on the information about the subject sent from the digital signal processing unit 123. Then, the CPU 10 sends recommended composition data representing a recommended composition to the digital signal processing unit 123. Incidentally, any of various methods may be employed for detecting the recommended composition. For example, it may be the rule of thirds in which the composition where the subject is placed on intersects of grid lines are drawn to divide the image frame into thirds horizontally and vertically is detected as a recommended composition.

The digital signal processing unit 123 generates a graphic signal of a frame that represents a recommended composition (hereinafter, also referred to as a recommended composition frame) and superposes the graphic signal on the digital image signal. In addition, the digital signal processing unit 123 also generates a frame that surrounds an image based on the digital image signal, or a frame that represents the composition of a captured image (hereinafter, also referred to as a captured image composition frame). As a result, the recommended composition frame and the captured image composition frame are displayed together with a through-the-lens image. Here, if the shutter button 106 of the operation unit 114 is pushed completely, then the CPU 110 records an image in response to this operation.

At this time, the digital signal processing unit 123 compresses the digital image signal sent from the A/D converter unit 122 in compression/decompression format, such as JPEG, under the control of the CPU 110. Incidentally, the term "JPEG" is the abbreviation for "Joint photographic Experts Group".

The CPU 110 generates an image file by adding shooting data and time as meta data to the compressed image data and then records the image data on the recording unit 124. In this way, the CPU 110 records the image of interest.

Here, the recording unit 124 may be, for example, a nonvolatile memory of several gigabytes to several tens of gigabytes, a recording medium previously installed in the DSC 100, or a recording medium removably attached to the DSC 100, such as a memory card.

Furthermore, the DSC 100 includes a flash memory 125 independently of the recording unit 124. The CPU 110 stores information in the flash memory, where the information is desired to be retained even after power off, such as various kinds of information defined by the user.

Furthermore, when the user pushes the power button 108 of the operation unit 114 or the user performs the touch operation on the touch panel 113 to instruct the switching from the operation mode to the replay mode, the CPU 110 starts to operate replay mode.

At this time, for example, the CPU 110 reads out one of image files, such as one with the most recent shooting date and time, recorded in the recording unit 124. Then the CPU 110 extracts compressed image data from the image file and then sends the image file to the digital signal processing unit 123.

The digital signal processing unit 123 expands the compressed image data sent from the CPU 110 under the control of the CPU 110, to obtain the same digital image signal as one before compression, followed by sending the resulting signal to the liquid crystal panel 115. As a result, the liquid crystal panel 115 displays the reproduced image. In this way, the CPU 110 reproduces the image of interest.

At this time, furthermore, the digital signal processing unit 123 generates a graphic signal, such as a button or an icon, and superposes the graphic signal on the digital image signal. As a result, the liquid panel 115 can display the reproduced image with one or more of buttons and icons.

1-4. Process for Displaying Recommended Composition Frame

Furthermore, as described above, the DSC 100 detects the recommended composition of a subject recognized in shooting and displays a recommended composition frame, which represents the recommended composition, on a through-the-lens image. Hereinafter, the process for displaying the recommended composition frame will be described in detail.

Figure 4A:
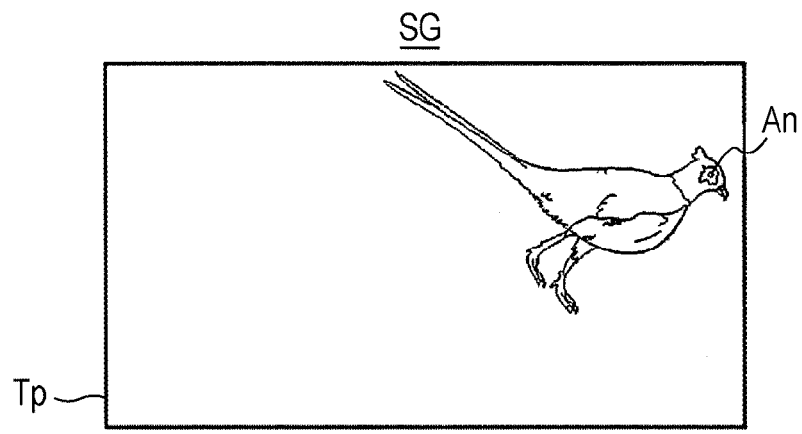
FIG. 4 is a schematic diagram illustrating a display example of a recommended composition frame.

If the CPU 110 is instructed to be changed to shooting mode, as shown in FIG. 4A, the CPU 110 allows the liquid crystal panel 115 to display a shooting mode screen SG, which is a display screen in shooting mode. A through-the-lens image Tp is displayed on the entire imaging mode screen SG. In this case, for example, it is considered that an animal An is shown as a subject on the through-the-lens image Tp.

If the shutter button 106 is half-pressed at this time, the CPU 110 allows the digital signal processing unit 123 to carry out a subject recognition as described above to obtain information about the subject, which represents the position, size, and shape of the subject, the animal An.

Figure 4B:
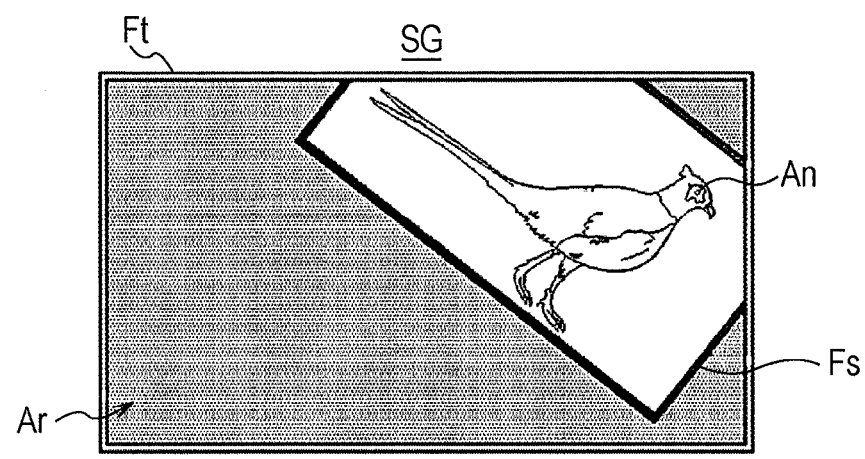

Furthermore, the CPU 110 detects the recommended composition of the animal An based on the information about the subject and then allows the shooting mode screen SG to display a recommended composition frame Fs that represents the recommended composition as shown in FIG. 4B. Since the recommended composition is of the animal An, the recommended composition frame Fs is of the subject, the animal An. The CPU 110 allows the shooting mode screen SG to display the shooting image composition frame Ft together with the recommended composition frame Fs.

At this time, the CPU 110 displays an area Ar that serves as a recommended composition frame Fs of the through-the-lens image Tp while lowering the brightness of the area Ar. Therefore, the DSC 100 allows the user to display the recommended composition frame Fs with an emphasis thereon.

Figure 4C:
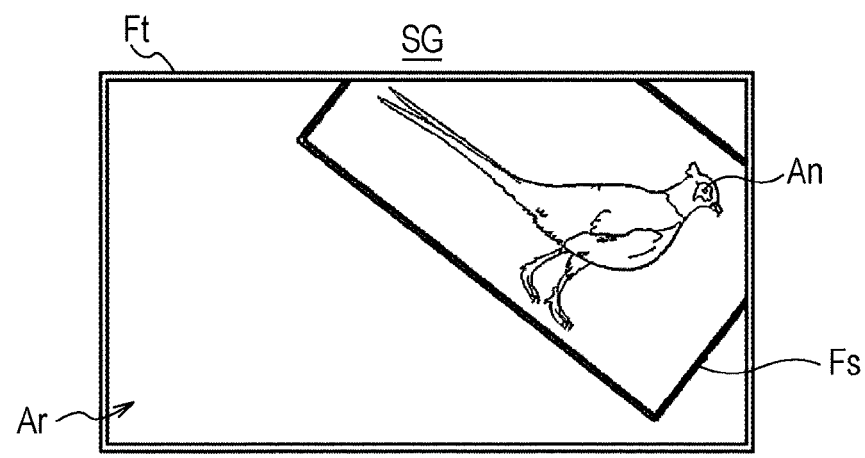

Subsequently, as shown in FIG. 4C, the CPU 110 restores the brightness of the area Ar of the through-the-lens image Tp after passing a predetermined time (e.g., several seconds) from the representation of the recommended composition frame Fs. Therefore, after presenting the recommended composition to the user, the DSC 100 can prevent the through-the-lens image Tp from becoming hard to see because of a decrease in brightness of the region Ar.

The CPU 110 allows the digital signal processing unit 123 to execute a process for recognizing a subject every predetermined time, so that the CPU 110 can continuously recognize the subject. Consequently, when the user performs the operation of pan, tilt, rotation, or the like, the CPU 110 recognizes the movement, rotation, or change in size of the subject in the captured image.

The CPU 110 causes the displacement, rotation, or change in size of the recommended composition frame Fs depending on a change in the subject. In other words, the recommended composition frame Fs is fixed with reference to the photographic subject in the through-the-lens image Tp and changed in the through-the-lens image Tp depending on the change of the subject.

Figure 5A:
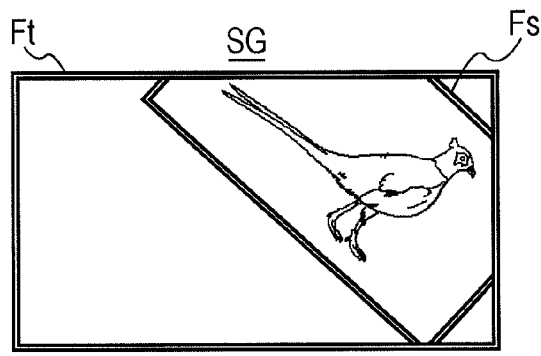
FIG. 5 is a schematic diagram illustrating an operation of fitting the composition of a captured image to a recommended composition.

Here, as shown in FIG. 5A, in a state where the recommended composition frame Fs is displayed on the right side of the through-the-lens image Tp, it is assumed that the user fits the composition of the captured image to the recommended composition.

Here, in the following direction, the term "pan direction" refers to the longitudinal or horizontal direction of the case 101 of the DSC 100 and the term "tilt direction refers to the height or vertical direction. In addition, the term "zoom direction" refers to the direction along which the lens is directed to of the DSC 100 (the front direction of the case 101) and the term "rotation direction" refers to the direction along which the case 101 rotates.

Figure 5B:
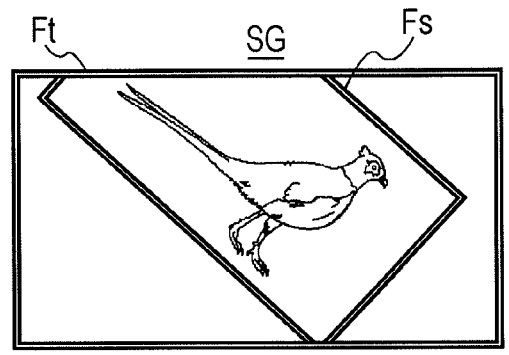

First, for example, it is regarded that the user performs the operation of shaking the case 101 of the DSC 100 to the right (i.e., pan operation in the right direction) to fit the composition of the captured image to the recommended composition in the pan direction as shown in FIG. 5B. Here, the state where the composition of the captured image is being fit to the recommended composition in the pan direction refers to the state where the recommended composition frame Fs is fit to the captured image composition frame Ft in the pan direction. Then, on the X-Y plane coordinates where the direction along the X axis refers to the pan direction and the direction along the Y axis refers to the tilt direction, the state where the recommended composition frame Fs is fit to the captured image composition frame Ft in the pan direction refers to the state where the X coordinate of the center of the recommended composition frame Fs corresponds to the X coordinate of the center of the captured image composition frame Ft.

In practice, however, the user holds the case 101 by only one hand or both hands. Thus, the user may hardly support the case 101 in suitable fashion without shake and the composition of a captured image may tend to be displaced. Thus, the subject is displaced with respect to the through-the-lens image Tp, so that the recommended composition frame Fs fixed on the subject can be also displaced with respect to the through-the-lens image Tp. Therefore, it is hard to precisely fit the recommended composition frame Fs to the captured image composition frame Ft in the pan direction. For this reason, in the DSC 100, if it is determined that the composition of the captured image and the recommended composition thereof are substantially fit to each other in the pan direction (i.e., similar to each other), the recommended composition frame Fs is displayed while it is fixed at the position corresponding to the captured image composition frame Fr in the pan direction. In other words, the DSC 100 displays the recommended composition frame Fs, which has been fixed on the subject, so that it is fixed on the through-the-lens image Tp in the pan direction. Furthermore, for example, the displacement between the composition of the captured image and the recommended composition is within a range of possible displacement to be caused when the user holds the case 101, the DSC 100 determines that the composition of the captured image and the recommended composition are similar to each other.

Therefore, even if the composition of the captured image is slightly displaced in the pan direction, the recommended composition frame Fs can be prevented from being displaced in the pan direction. Thus, the user can recognize that the composition of the captured image if fit to the recommended composition in the pan direction. Therefore, the DSC 100 can reduce the difficulty of user's operation to fit the composition of the captured image to the recommended composition, leading to a reduced burden on the user.

Figure 5C:
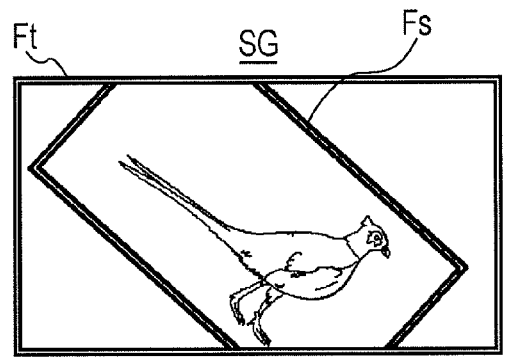

Next, for example, it is regarded that the user performs the operation of shaking the case 101 upward (i.e., tilt operation in the upward direction) to fit the composition of the captured image to the recommended composition in the tilt direction as shown in FIG. 5C. Here, the state where the composition of the captured image is being fit to the recommended composition in the tilt direction refers to the state where the recommended composition frame Fs is fit to the captured image composition frame Ft in the tilt direction. In addition, the state where the recommended composition frame Fs is fit to the captured image composition frame Ft in the tilt direction refers to the state where the Y coordinate of the center of the recommended composition frame Fs corresponds to the Y coordinate of the center of the captured image composition frame Ft.

At this time, if the DSC 100 determines that the composition of the captured image is similar to the recommended composition in the tilt direction, just as in the case with the pan direction, the DSC 100 displays the recommended composition frame Fs after fixing it at a position where it is fit to the captured image composition frame Ft in the tilt direction. In other words, the DSC 100 fixes and displays the recommended composition frame Fs on the through-the-lens image Tp in the tilt direction.

As a result, the DSC 100 can allow the user to recognize that the composition of the captured image is fit to the recommended composition in both the pan direction and the tilt direction.

Figure 5D:
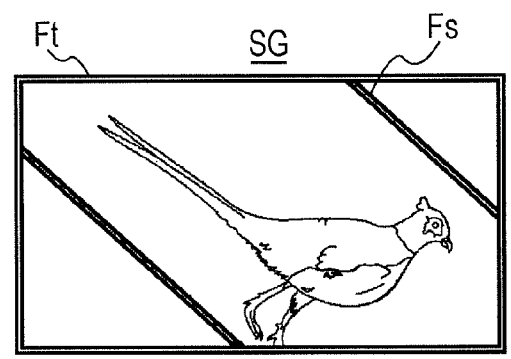

Furthermore, for example, it is regarded that the user carries out the zoom-in operation to fit the composition of the captured image to the recommended composition in the zoom direction as shown in FIG. 5D.

Here, the state where the composition of the captured image is being fit to the recommended composition in the zoom direction refers to the state where the recommended composition frame Fs is fit to the captured image composition frame Ft in the zoom direction. In addition, the state where the recommended composition frame Fs is fit to the captured image composition frame Ft in the zoom direction refers to the state where the size of the recommended composition frame Fs is the same as that of the captured image composition frame Ft.

At this time, if the DSC 100 determines that the composition of the captured image is similar to the recommended composition in the zoom direction, just as in the case with the pan and tilt directions, the DSC 100 displays the recommended composition frame Fs after fixing it at a position where it is fit to the captured image composition frame Ft in the zoom direction. In other words, the DSC 100 fixes and displays the recommended composition frame Fs on the through-the-lens image Tp in the zoom direction.

As a result, the DSC 100 can allow the user to recognize that the composition of the through-the-lens image Tp is fit to the recommended composition in each of the pan, tilt, and zoom directions.

Figure 5E:
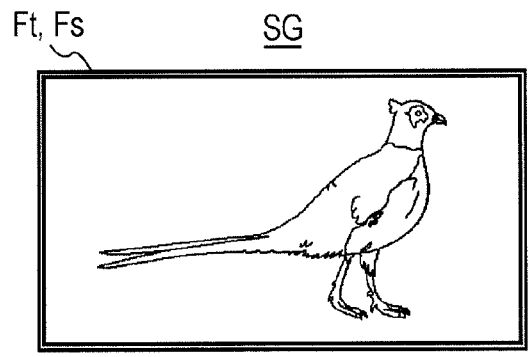

Furthermore, for example, it is regarded that the user rotates the case 101 to the right (clockwise) to fit the composition of the captured image to the recommended composition in the rotation direction as shown in FIG. 5E. Here, the state where the composition of the captured image is being fit to the recommended composition in the rotation direction refers to the state where the recommended composition frame Fs is fit to the captured image composition frame Ft in the rotation direction. In addition, the state where the recommended composition frame Fs is fit to the captured image composition frame Ft in the rotation direction refers to the state where there commended composition frame Fs is in parallel with the captured image composition frame Ft.

At this time, if the DSC 100 determines that the composition of the captured image is similar to the recommended composition in the rotation direction, just as in the case with the pan, tilt, and zoom directions, the DSC 100 displays the recommended composition frame Fs after fixing it at a position where the recommended composition frame Fs is fit to the captured image composition frame Ft in the rotation direction. In other words, the DSC 100 fixes and displays the recommended composition frame Fs on the through-the-lens image Tp in the rotation direction.

As a result, the DSC 100 can allow the user to recognize that the composition of the captured image is fit to the recommended composition in each of the pan, tilt, zoom, and rotation directions. Therefore, the DSC 100 can allow the user to recognize that shooting is possible with the recommended composition.

In this way, the DSC 100 allows the user to perform the pan, tilt, zoom, and rotation operations to fit the composition of a captured image to the recommended composition in each of the pan, tilt, zoom, and rotation directions.

Here, if the composition of the captured image is similar to the recommended composition in each of the pan, tilt, zoom, and rotation directions, the DSC 100 fixes and displays the recommended composition frame Fs on the through-the-lens image Tp. Therefore, the DSC 100 can allow the user to recognize that the composition of the captured image is gradually fit to the recommended composition.

Next, the following description will describe a process for fixing and displaying a recommended composition frame Fs on the through-the-lens image Tp when the composition of a captured image is similar to the recommended composition thereof in each of the above directions (hereinafter, this process will be also referred to as a fixed display processing). First, the fixed display processing in the pan direction will be described.

Figure 6A:
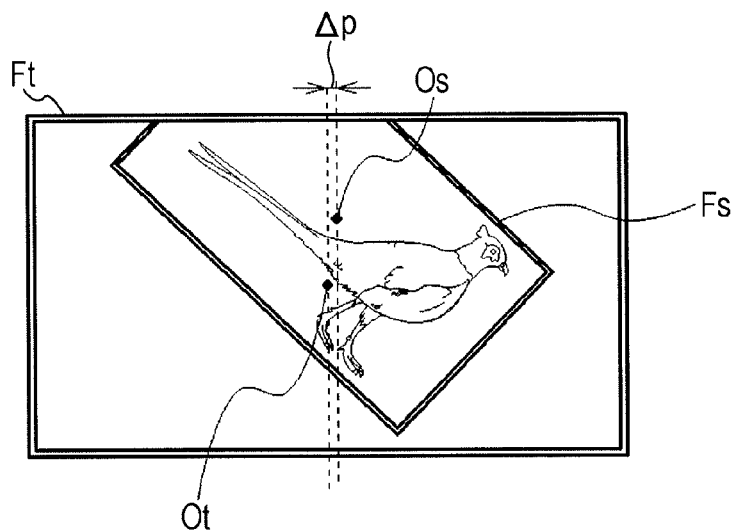
FIG. 6 is a schematic diagram illustrating fixed display processing in pan direction.

The CPU 110 starts the fixed display processing in the pan direction after displaying the recommended composition frame Fs and then calculates the amount of displacement between the composition of the captured image and the recommended composition ($\Delta p$) in the pan direction at every predetermined time interval. Specifically, as shown in FIG. 6A, the CPU 110 calculates the difference between the X coordinate of the center Ot of the captured image composition frame Ft and the X coordinate of the center Os of the recommended composition frame Fs as the amount of displacement $\Delta p$.

Then, the CPU 110 determines whether the amount of displacement $\Delta p$ is not more than a predetermined threshold (hereinafter, referred to as a first pan threshold). Here, for example, the first pan threshold is previously determined based on the range of possible displacement to be caused when the user holds the case 101 (for example, such a range may be previously determined by an experiment).

Figure 6B:
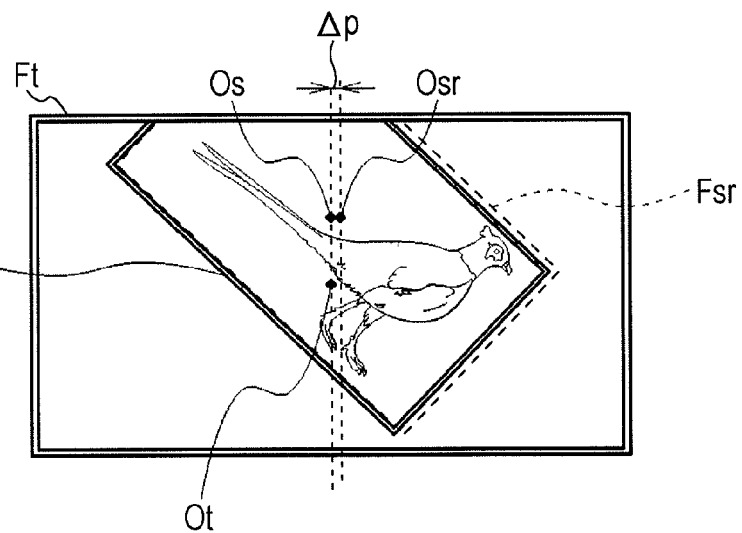

At this time, if it is determined that the amount of displacement $\Delta p$ is not more than the first pan threshold, the CPU 110 determines that the composition of the captured image is similar to the recommended composition in the pan direction. Then, the CPU 110 displays animation of the recommended composition frame Fs so that it can be drawn to the position where the recommended composition frame Fs and the captured image composition frame Ft are fit to each other in the pan direction. After that, as shown in FIG. 6B, the CPU 110 fixes and displays the recommended composition frame Fs at the position where the recommended composition frame Fs and the captured image composition frame Ft are fit to each other in the pan direction.

In this way, the CPU 110 starts the fixed display processing in the pan direction after fixing and displaying the recommended composition frame Fs on the captured image composition frame Ft and then recalculates the amount of displacement between the composition of the captured image and the recommended composition (Δp) in the pan direction at every predetermined time interval. At this time, the CPU 110 calculates the difference between the X coordinate of the center Ot of the captured image composition frame Ft and the X coordinate of the center Osr of the recommended composition frame Fsr as the amount of displacement Δp. Here, it is noted that the recommended composition frame Fsr is being fixed on the subject (represented by the dashed line in FIG. 6B, but not displayed in practice).

Then, the CPU 110 determines whether the amount of displacement Δp is not more than a predetermined threshold (hereinafter, referred to as a second pan threshold). Here, for example, the second pan threshold is previously determined based on the range of possible displacement to be caused when the user holds the case 101 in a manner similar to the first pan threshold.

Then, if it is determined that the amount of displacement Δp is not more than the second pan threshold, the CPU 110 determines that the composition of the captured image is still similar to the recommended composition. At this time, the CPU 110 keeps fixing and displaying the recommended composition frame Fs on the captured image composition frame Ft in the pan direction, but not on the subject.

In other words, even if the composition of the captured image and the recommended composition are slightly displaced from each other in the pan direction, the CPU 110 displays the recommended composition frame Fs as if the recommended composition frame Fs is absorbed on the position where the recommended composition frame. Fs is fit to the captured image composition frame Ft in the pan direction.

Therefore, even if the composition of the captured image is slightly moved by user's hand shaking or the like, the user can continuously recognize that the composition of the captured image is fit to the recommended composition in the pan direction. Therefore, the DSC 100 can prevent the user from feeling that the composition of a captured image is readily displaced from the recommended composition, leading to a reduced burden on the user.

In addition, if the amount of displacement Δp is higher than the second pan threshold as a result of displacement of the composition of the captured image by the pan operation, the CPU 110 determines that the composition of the captured image is not similar to the recommended composition in the pan direction. At this time, the CPU 110 stops the fixation (absorption) of the recommended composition frame Fs at the position where the recommended composition frame Fs is fit to the captured image composition frame Ft in the pan direction. Then, the recommended composition frame Fs is displayed while being fixed and displayed on the subject again. Incidentally, the above second pan threshold is defined so that it will be higher than the first pan threshold. Therefore, in the DSC 100, if the amount of displacement Δp is decreased not more than the first pan threshold onetime and the recommended composition frame Fs is then fixed on the captured image composition frame Ft in the pan direction. In this case, the amount of displacement Δp is hardly increased not more than the second pan threshold. Thus, the fixation can be hardly released. Therefore, the DSC 100 can further prevent the user from feeling that the composition of a captured image is readily displaced from the recommended composition, leading to a further reduction in burden on the user.

Furthermore, the CPU 110 is designed to carry out the fixed display processing in the tilt direction in a manner similar to the fixed display processing in the pan direction.

Figure 7A:
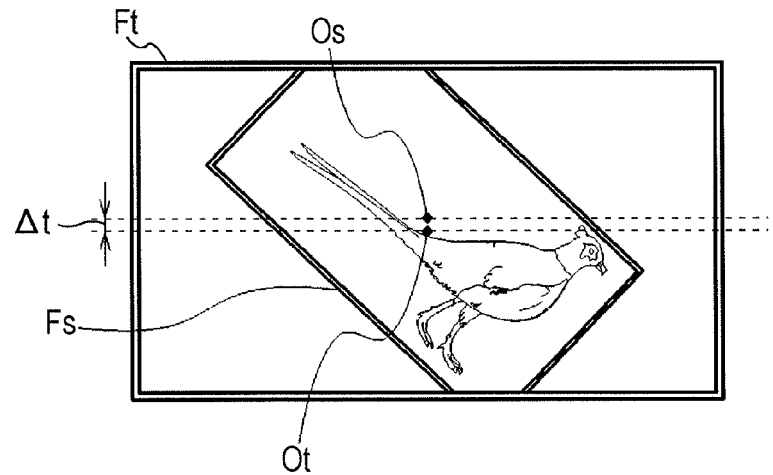
FIG. 7 is a schematic diagram illustrating fixed display processing in tilt direction.

Specifically, the CPU 110 starts the fixed display processing in the tilt direction after displaying the recommended composition frame Fs and then calculates the amount of displacement between the composition of the captured image and the recommended composition (Δt) in the tilt direction at every predetermined time interval. Specifically, as shown in FIG. 7A, the CPU 110 calculates the difference between the Y coordinate of the center Ot of the captured image composition frame Ft and the Y coordinate of the center Os of the recommended composition frame Fs as the amount of displacement Δt.

Then, if it is determined that the amount of displacement Δt is not more than a predetermined threshold (this is also referred to as a first tilt threshold), the CPU 110 determines that the composition of the captured image is continuously similar to the recommended composition in the tilt direction.

Figure 7B:
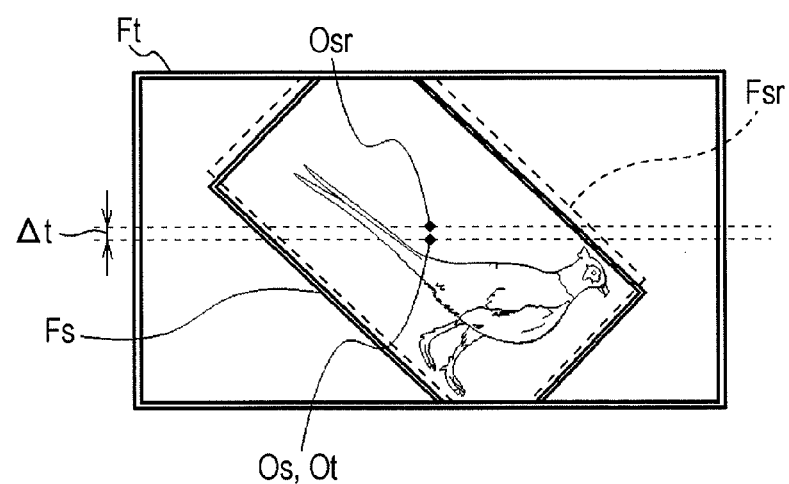

At this time, the CPU 110 displays animation of the recommended composition frame Fs so that it can be drawn to the position where the recommended composition frame Fs and the captured image composition frame Ft are fit to each other in the tilt direction. After that, as shown in FIG. 7B, the CPU 110 fixes and displays the recommended composition frame Fs at the position where the recommended composition frame Fs and the captured image composition frame Ft are fit to each other in the tilt direction.

In this way, the CPU 110 starts the fixed display processing in the tilt direction after fixing and displaying the recommended composition frame Fs on the captured image composition frame Ft and then recalculates the amount of displacement between the composition of the captured image and the recommended composition (Δt) in the tilt direction at every predetermined time interval. At this time, the CPU 110 calculates the difference between the Y coordinate of the center Ot of the captured image composition frame Ft and the Y coordinate of the center Osr of the recommended composition frame Fsr as the amount of displacement Δt. Here, it is noted that the recommended composition frame Fsr is being fixed on the subject (represented by the dashed line in FIG. 7B, but not displayed in practice).

Then, if it is determined that the amount of displacement Δt is not more than a predetermined threshold (this is also referred to as a second tilt threshold), the CPU 110 determines that the composition of the captured image is continuously similar to the recommended composition in the tilt direction. At this time, the CPU 110 keeps fixing and displaying the recommended composition frame Fs on the captured image composition frame Ft in the tilt direction, but not on the subject.

In other words, even if the composition of the captured image and the recommended composition are slightly displaced from each other in the tilt direction, the CPU 110 displays the recommended composition frame Fs as if the recommended composition frame Fs is absorbed on the position where the recommended composition frame Fs is fit to the captured image composition frame Ft in the tilt direction.

In addition, if the amount of displacement Δt is higher than the second pan threshold as a result of displacement of the composition of the captured image by the tilt operation, the CPU 110 determines that the composition of the captured image is not similar to the recommended composition in the tilt direction. At this time, the CPU 110 stops the fixation of the recommended composition frame Fs at the position where the recommended composition frame Fs is fit to the captured image composition frame Ft in the tilt direction. Then, the recommended composition frame Fs is displayed while being fixed and displayed on the subject again.

Here, for example, the first and second tilt thresholds are previously determined based on the range of possible displacement to be caused when the user holds the case 101 in a manner similar to the fixed display processing in the above pan direction. In addition, in a manner similar to the fixed display processing in the pan direction, the second tilt threshold is defined so that it will be higher than the first tilt threshold.

Furthermore, the CPU 110 is designed to carry out the fixed display processing in the zoom direction in a manner similar to the fixed display processing in each of the pan and tilt directions.

Specifically, the CPU 110 starts the fixed display processing in the zoom direction after displaying the recommended composition frame Fs and then calculates the amount of displacement between the composition of the captured image and the recommended composition ($\Delta z$) (not shown) in the zoom direction at every predetermined time interval.

Figure 8A:
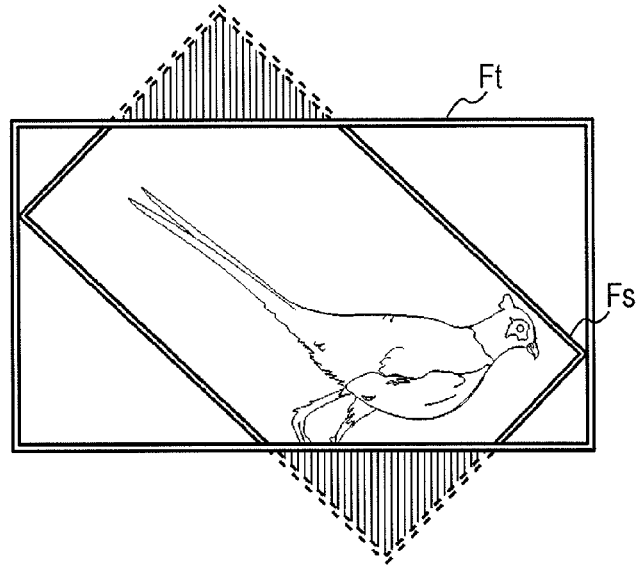
FIG. 8 is a schematic diagram illustrating fixed display processing in zoom direction.

Specifically, the CPU 110 calculates the difference between the surface area of the captured image composition frame Ft and the surface area of the recommended composition frame Fs (portion not displayed on the through-the-lens image Tp (portion represented by the diagonal line shown in FIG. 8A)) as the amount of displacement $\Delta z$.

Then, if it is determined that the amount of displacement $\Delta z$ is not more than a predetermined threshold (this is also referred to as a first zoom threshold), the CPU 110 determines whether the composition of the captured image is continuously similar to the recommended composition in the zoom direction.

Figure 8B:
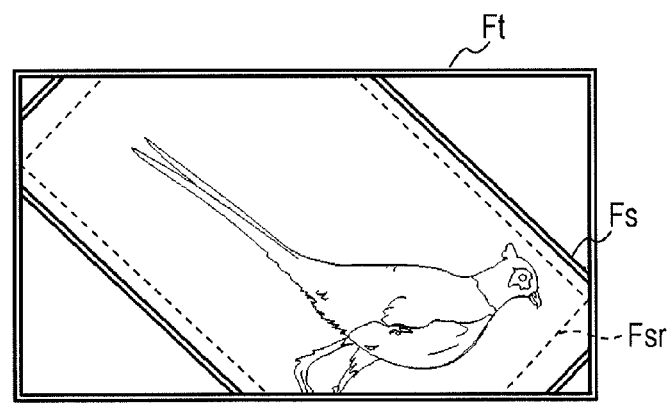

At this time, if it is determined that the composition of the captured image is similar to the recommended composition in the zoom direction, then the CPU 110 displays the recommended composition frame Fs so that the size of the recommended composition corresponds to the size of the captured image composition frame Fs as shown in FIG. 8B by expanding or reducing the recommended composition frame Fs. Then, the CPU 110 displays animation of the recommended composition frame Fs so that it can be drawn to a frame having the same size as that of the captured image composition frame Fs.

In this way, the CPU 110 starts the fixed display processing in the zoom direction after fixing and displaying the recommended composition frame Fs on the captured image composition frame Ft and then recalculates the amount of displacement between the composition of the captured image and the recommended composition ($\Delta z$) in the zoom direction at every predetermined time interval. At this time, the CPU 110 calculates the difference between the surface area of the captured image composition frame Ft and the surface area of the recommended composition frame Fsr as the amount of displacement $\Delta z$. Here, it is noted that the recommended composition frame Fsr represents the recommended composition when it is being fixed on the subject (represented by the dashed line in FIG. 8B, but not displayed in practice).

Then, if it is determined that the amount of displacement $\Delta z$ is not more than a predetermined threshold (this is also referred to as a second zoom threshold), the CPU 110 determines that the composition of the captured image is continuously similar to the recommended composition in the zoom direction. At this time, the CPU 110 keeps fixing and displaying the size of the recommended composition frame Fs on the captured image composition frame Ft, but not on the subject.

In other words, even if the composition of the captured image and the recommended composition are slightly displaced from each other in the zoom direction, the CPU 110 displays the recommended composition frame Fs as if the recommended composition frame Fs is absorbed on the frame having the same size as that of the captured image composition frame Ft.

In addition, if the amount of displacement $\Delta z$ is higher than the second zoom threshold as a result of displacement of the composition of the captured image by the zoom operation, the CPU 110 determines that the composition of the captured image is not similar to the recommended composition in the zoom direction. At this time, the CPU 110 stops the fixation of the recommended composition frame Fs on the captured image composition frame Ft in the zoom direction. Then, the recommended composition frame Fs is displayed while being fixed and displayed on the subject again.

Here, for example, the first and second zoom thresholds are previously determined based on the range of possible displacement to be caused when the user holds the case 101 in a manner similar to the fixed display processing in the above pan direction. In addition, in a manner similar to the fixed display processing in the pan direction, the second zoom threshold is defined so that it will be higher than the zoom threshold.

Furthermore, the CPU 110 is designed to carry out the fixed display processing in the rotation direction in a manner similar to the fixed display processing in each of the pan, tilt, and zoom directions.

Figure 9A:
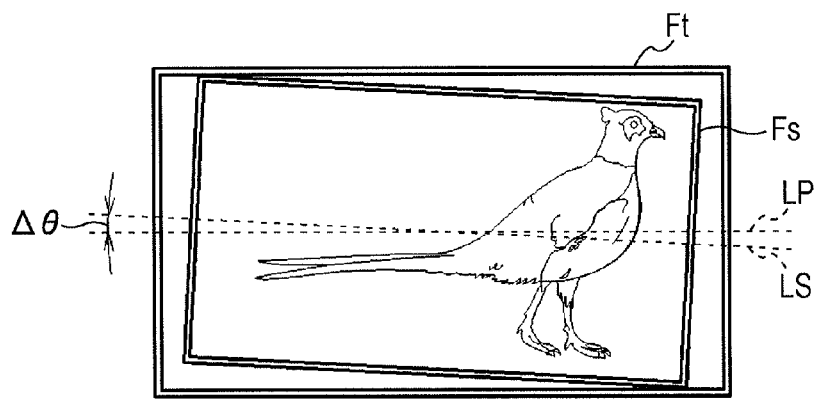
FIG. 9 is a schematic diagram illustrating fixed display processing in rotation direction.

Specifically, the CPU 110 starts the fixed display processing in the rotation direction after displaying the recommended composition frame Fs. Then the CPU 110 calculates the amount of displacement between the composition of the captured image and the recommended composition ($\Delta \theta$) in the rotation direction. Specifically, as shown in FIG. 9A, the CPU 110 calculates the angle which the center line Lp of the captured image composition frame Ft in the pan direction forms with the center line Ls of the recommended composition frame Fs in the pan direction as the amount of displacement $\Delta \theta$.

Then, if it is determined that the amount of displacement $\Delta \theta$ is not more than a predetermined threshold (this is also referred to as a first rotation threshold), the CPU 110 determines whether the composition of the captured image is continuously similar to the recommended composition in the rotation direction.

Figure 9B:
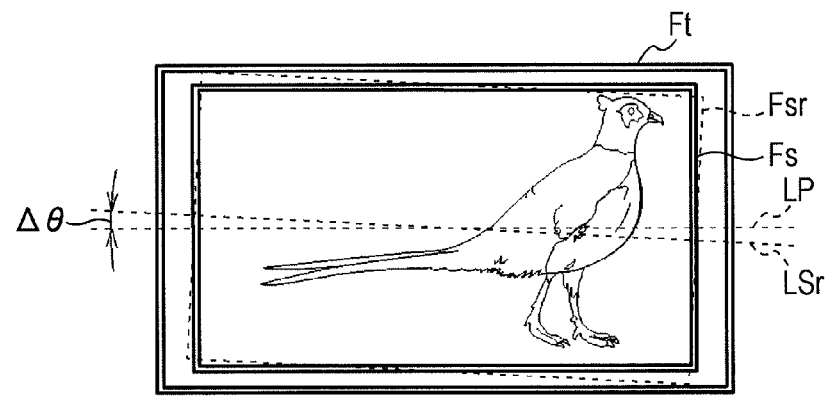

At this time, if it is determined that the composition of the captured image is similar to the recommended composition in the rotation direction, then the CPU 110 displays the recommended composition frame Fs so that the recommended composition can be in parallel with the captured image composition frame Ft as shown in FIG. 9B by rotating the recommended composition frame Fs. Then, the CPU 110 displays animation of the recommended composition frame Fs so that it can be drawn to the position where the recommended composition frame Ft is in parallel with the captured image composition frame Ft.

In this way, the CPU 110 starts the fixed display processing in the rotation direction after fixing and displaying the recommended composition frame Fs on the captured image composition frame Ft and then recalculates the amount of displacement between the composition of the captured image and the recommended composition ($\Delta \theta$) in the rotation direction at every predetermined time interval.

At this time, the CPU 110 calculates the angle with the center line Lp of the captured image composition frame Ft forms with the center line Lsr of the recommended composition frame Fsr in the pan direction as the amount of displacement $\Delta \theta$. Here, it is noted that the recommended composition frame Fsr is being fixed on the subject (represented by the dashed line in FIG. 9B, but not displayed in practice).

Then, if it is determined that the amount of displacement Δθ is not more than a predetermined threshold (this is also referred to as a second rotation threshold), the CPU 110 determines that the composition of the captured image is continuously similar to the recommended composition in the rotation direction.

At this time, the CPU 110 keeps fixing and displaying the recommended composition frame Fs on the captured image composition frame Ft, but not on the subject. In other words, even if the composition of the captured image and the recommended composition are slightly displaced from each other in the rotation direction, the CPU 110 continuously fixes the position of the recommended composition frame Fs and displays it as if the recommended composition frame Fs is absorbed on the position where the recommended composition frame Fs is in parallel with the captured image composition frame Ft.

In addition, if the amount of displacement Δθ is higher than the second rotation threshold as a result of displacement of the composition of the captured image by the rotation operation, the CPU 110 determines that the composition of the captured image is not similar to the recommended composition in the rotation direction. At this time, the CPU 110 stops the fixation of the recommended composition frame Fs on the captured image composition frame Ft in the rotation direction. Then, the recommended composition frame Fs is displayed while being fixed and displayed on the subject again.

Here, for example, the first and second rotation thresholds are previously determined based on the range of possible displacement to be caused when the user holds the case 101 in a manner similar to the fixed display processing in the above rotation direction. In addition, in a manner similar to the fixed display processing in the pan direction, the second rotation threshold is defined so that it will be higher than the first rotation threshold.

In each of the directions (i.e., pan, tilt, zoom, and rotation directions) of the DSC 100, therefore, the DSC 100 is designed to carry out the fixed display processing which fixes and displays the recommended composition frame Fs on the position where the recommended composition frame Fs is fit to the captured image composition frame Ft in the above direction.

Incidentally, a specific example of hardware configuration for the captured image acquisition unit 2 and the subject recognition unit 3 of the information processing apparatus 1 is the digital signal processing unit 123 of the DSC 100. In addition, a specific example of hardware configuration for the recommended composition acquisition unit 4 and the control unit 5 of the information processing apparatus 1 is the CPU 110 of the above DSC100. The specific example of the display screen described in the outline is the aforementioned imaging mode screen SG. In addition, the specific example with respect to the frame that represents the subject and the information that represents the recommended composition described in the outline is the aforementioned recommended composition frame Fs.

1-5. Steps of Process for Displaying Recommended Composition Frame

Figure 10:
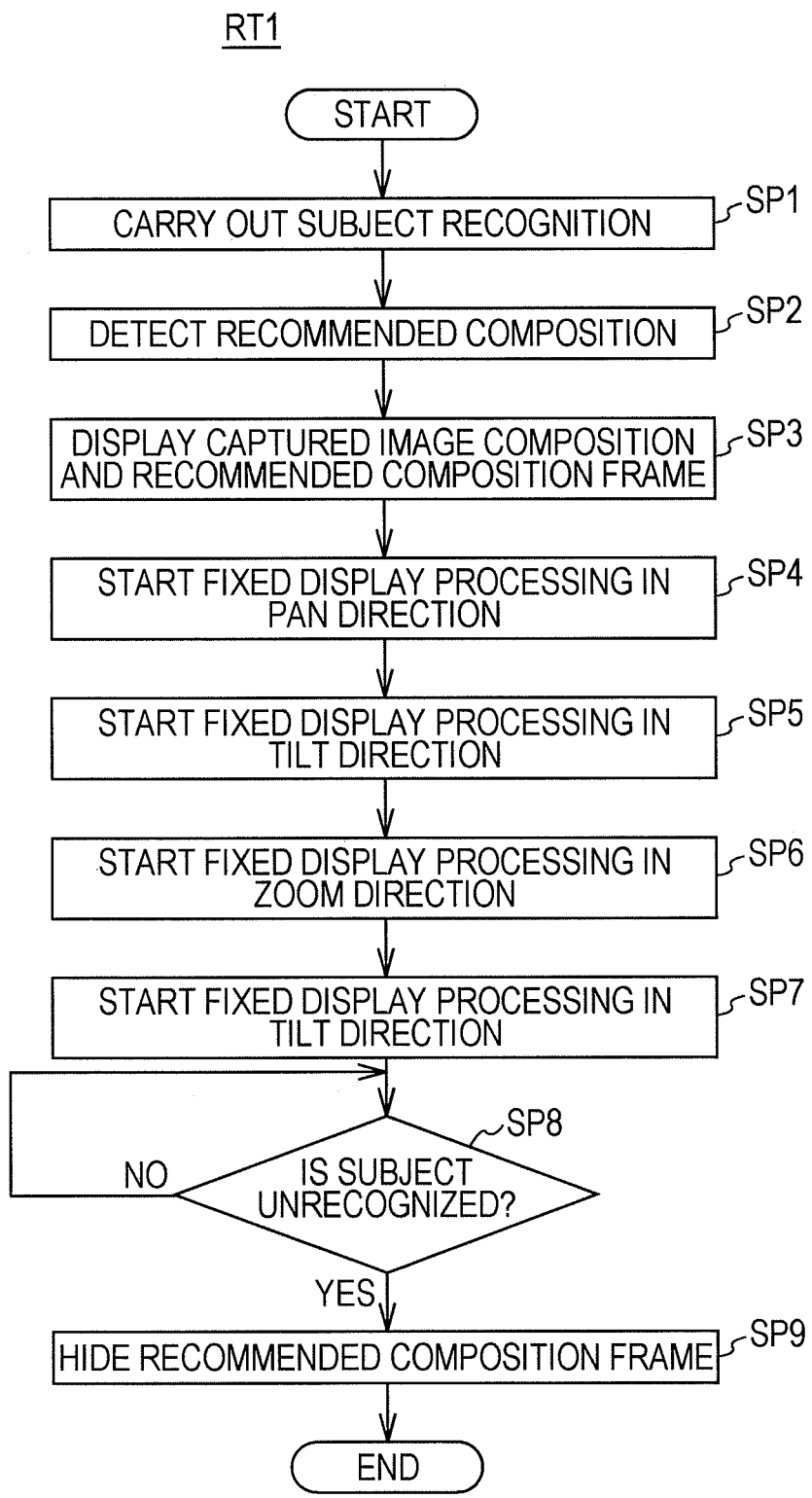
FIG. 10 is a flow chart representing display processing for recommended composition frame.

Next, the steps of a process for displaying the aforementioned recommended composition frame Fs (hereinafter, also simply referred to as a process for displaying recommended composition frame). The process for displaying recommended composition frame is carried out according to a program read out from the ROM 111 by the CPU 110 of the DSC 100. For example, if the shutter button 106 is half-pressed, then the CPU 110 starts the process for displaying recommended composition frame, RT1, as shown in FIG. 10. The process proceeds to the step SP1.

In the step SP1, the CPU 110 carries out subject recognition where a subject is recognized from a captured image, which is currently displayed as a through-the-lens image Tp, by controlling the digital signal processing unit 123. Then, the CPU 110 acquires information about recognition of the subject (subject recognition information) as a result of the subject recognition from the digital signal processing unit 123. Subsequently, the process proceeds to the step SP2.

In the step SP2, the CPU 110 detects the recommended composition of the recognized subject based on the subject recognition information. Then, the process proceeds to the step SP3. In the step SP3, the CPU 110 displays a recommended composition frame Fs that represents the recommended composition together with the subject and a captured image composition frame Ft that represents the composition of the captured image on the through-the-lens image Tp. Then, the process proceeds to the step SP4.

In the step SP4, the CPU 110 starts fixed display processing in the aforementioned pan direction. Then the process proceeds to the step SP5.

In the step SP5, the CPU 110 starts fixed display processing in the aforementioned tilt direction. Then the process proceeds to the step SP6.

In the step SP6, the CPU 110 starts fixed display processing in the aforementioned zoom direction. Then the process proceeds to the step SP7.

In the step SP7, the CPU 110 starts fixed display processing in the aforementioned rotation direction. Then the process proceeds to the step SP8.

In the step SP8, the CPU 110 determines whether the subject recognized in the step SP1 is now unrecognized from the captured image currently displayed as a through-the-lens image Tp.

If a negative result is obtained in the step SP8, this fact means that the recognized subject is still in shooting. At this time, the CPU 110 continuously carries out the fixed display processing in each of the directions (i.e., pan direction, tilt direction, zoom direction, and rotation direction) while the process returns to the step SP8. In other words, the CPU 110 continues the fixed display processing in each direction while representing the recommended composition frame Fs until the subject recognized in the step SP1 is unrecognized from the captured image.

On the other hand, if a positive result is obtained in the step SP 8, then this fact means that the recognized subject is not captured, or the user does not intend to capture the subject. At this time, the CPU 110 terminates the fixed display processing in each direction while hiding the recommended composition frame Fs.

According to such a process for displaying recommended composition frame RT1, the CPU 110 controls the display of recommended composition frame Fs.

1-6. Steps of Fixed Display Processing

Next, the steps of the aforementioned fixed display processing (also simply referred to as fixed display processing) will be described. The fixed display processing is carried out according to a program read out from the ROM 111 by the CPU 110 of the DSC 100.

The CPU 110 carries out the fixed display processing in each of the predetermined directions (pan direction, tilt direction, zoom direction, and rotation direction) of the captured image as described above. The fixed display processing is almost the same procedure in the respective directions, so that the description will be only made for the fixed display processing in the pan direction. The description about the fixed display processing in each of tilt, zoom, and rotation directions will be omitted.

Figure 11:
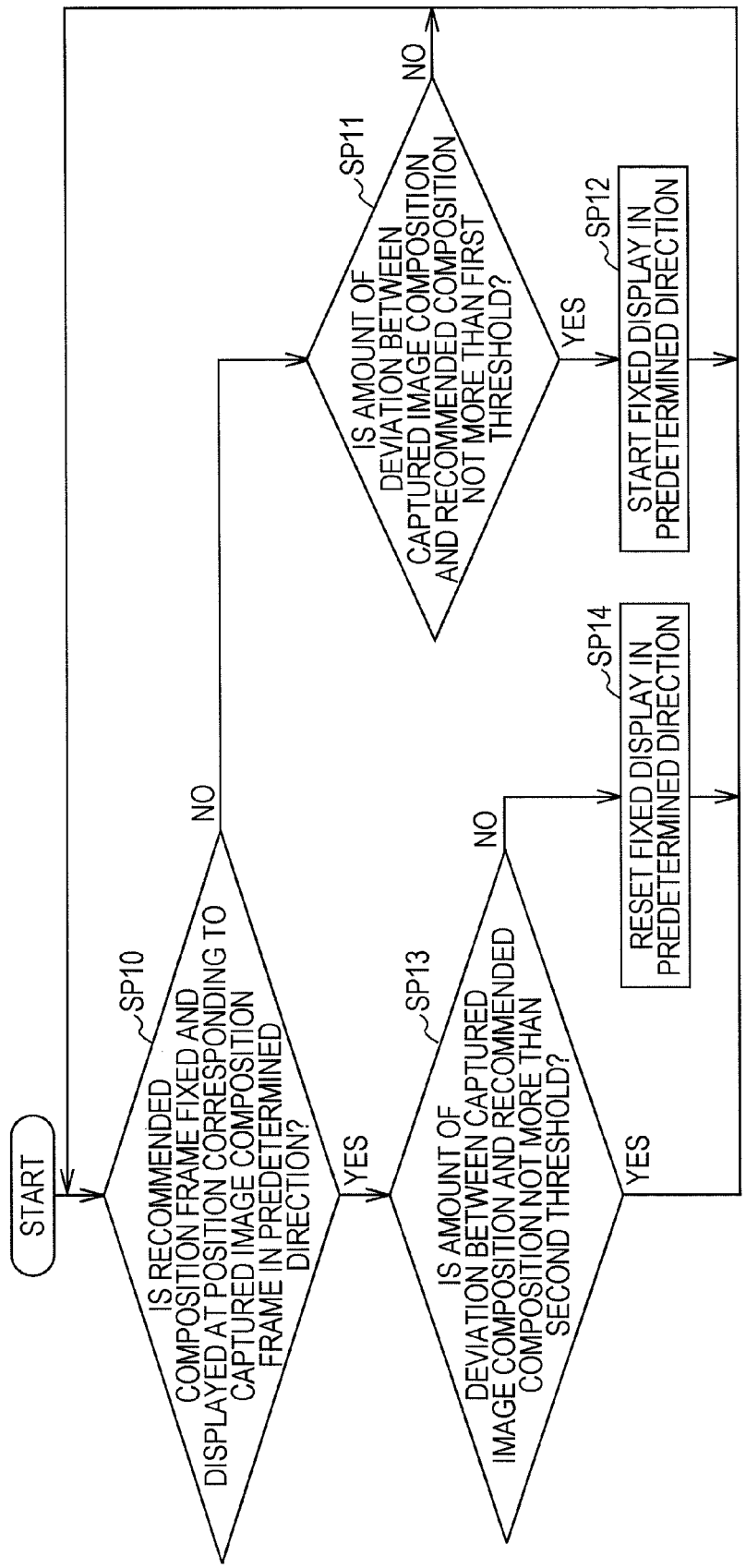
FIG. 11 is a flow chart representing fixed display processing.

In the step SP4 of the process for displaying recommended composition frame RT1, the CPU 110 starts the fixed display processing in the pan direction RT2 as shown in FIG. 11. Then, the process proceeds to the step SP10.

In the step SP10, the CPU 110 determines whether the recommended composition frame Fs is fixed and displayed at the position corresponding to the captured image composition frame Ft in the predetermined direction. In other words, the CPU 110 determines whether the recommended composition frame Fs is fixed and displayed on the captured image composition frame Ft.

If a negative result is obtained in this step SP10, this fact means that the recommended composition frame Fs is fixed and displayed on the subject in the pan direction. Then, the CPU 110 proceeds the process to the next step SP11. In the step SP11, the CPU 110 determines whether the amount of displacement Δp between the displacement between the composition of the captured image and the recommended composition in the pan direction is not more than a first pan threshold.

If a positive result is obtained in this step SP11, the CPU 110 determines that the composition of the captured image is similar to the recommended composition in the pan direction. Then, the CPU 110 proceeds the process to the next step SP12.

In the step SP12, the CPU 110 displays animation of the recommended composition frame Fs so that it can be drawn to the position where the recommended composition frame Fs and the captured image composition frame Ft are fit to each other in the pan direction. Subsequently, the CPU 110 fixes and displays the recommended composition frame Fs on the captured image composition frame Ft, followed by returning the process to the step SP10.

On the other hand, if a negative result is obtained in the step SP11, this fact means that the composition of the captured image is not similar to the recommended composition in the pan direction. At this time, the CPU 110 does not perform the step SP12 and returns the process to the step SP10 while keeping fixing and displaying the recommended composition frame Fs on the subject.

If a positive result is obtained by fixing and displaying the recommended composition frame Fs at the position corresponding to the captured image composition frame Ft in the pan direction, the CPU 110 proceeds the process to the next step SP13.

In the step SP13, the CPU 110 determines whether the amount of displacement Δp between the displacement between the composition of the captured image and the recommended composition in the pan direction is not more than a second pan threshold.

If a positive result is obtained in this step SP13, the CPU 110 determines that the composition of the captured image is continuously similar to the recommended composition in the pan direction. At this time, the CPU 110 returns the process to the step SP10 while keeping fixing and displaying the recommended composition frame Fs on the captured image composition frame Ft in the pan direction.

On the other hand, if a negative result is obtained in the step SP13, this fact means that the composition of the captured image is not similar to the recommended composition in the pan direction. Then, the CPU 110 returns the process to the step SP14.

In the step SP14, the CPU 110 resets the fixation of the recommended composition frame Fs at the position corresponding to the captured image composition frame Ft in the pan direction. In other words, the CPU 110 fixes and displays the recommended composition frame Fs on the subject in the pan direction. Then, the CPU 110 returns the process to the step SP10.

According to such a kind of the fixed display processing, the CPU 110 is able to control the fixed display of the recommended composition frame Fs on the captured image composition frame Ft in the predetermined directions (pan, tilt, zoom, and rotation directions).

1-7. Operation and Effect

According to the above configuration of the DSC 110, the digital signal processing unit 123 of the DSC 100 carries out the subject recognition where a subject is recognized from a captured image currently displayed as a through-the-lens image Tp when the shutter button 106 is half-pressed. Then, the digital signal processing unit 123 sends the result of the subject recognition to the CPU 110 of the DSC 100.

The CPU 110 of the DSC 100 detects the recommended composition, which is a composition recommended for the subject, based on the result of the subject recognition sent from the digital signal processing unit 123.

Then the CPU 110 displays a recommended composition frame Fs that represents the recommended composition together with the position of the subject and a captured image composition frame Ft that represents the composition of the captured image on the through-the-lens image Tp on the liquid crystal panel 115.

Therefore, the DSC 100 can allow the user to recognize that the composition of the captured image can be fit to the recommended composition by fitting the recommended composition frame Fs to the captured image composition frame Ft.

Subsequently, if the CPU 110 determines that the composition of the captured image is similar to the recommended composition in the pan direction, the CPU 110 displays animation of the recommended composition frame Fs so that it can be drawn to the position where the recommended composition frame Fs and the captured image composition frame Ft are fit to each other in the pan direction. After that, the CPU 110 fixes the recommended composition frame Fs on the position where the recommended composition frame Fs is drawn to.

Furthermore, if the CPU 110 determines that the composition of the captured image is similar to the recommended composition in the tilt direction, the CPU 110 displays animation of the recommended composition frame Fs so that it can be drawn to the position where the recommended composition frame Fs and the captured image composition frame Ft are fit to each other in the tilt direction. After that, the CPU 110 fixes the recommended composition frame Fs on the position where the recommended composition frame Fs is drawn to.

Furthermore, if the CPU 110 determines that the composition of the captured image is similar to the recommended composition in the zoom direction, the CPU 110 displays animation of the recommended composition frame Fs so that it can be drawn to the state where the recommended composition frame Fs and the captured image composition frame Ft are fit to each other in the zoom direction. After that, the CPU 110 fixes and displays the recommended composition frame Fs in the state where the recommended composition frame Fs is drawn to.

Furthermore, if the CPU 110 determines that the composition of the captured image is similar to the recommended composition in the rotation direction, the CPU 110 displays animation of the recommended composition frame Fs so that it can be drawn to the state where the recommended composition frame Fs and the captured image composition frame Ft are fit to each other in the rotation direction.

After that, the CPU 110 fixes and displays the recommended composition frame Fs in the state where the recommended composition frame Fs is drawn to.

In this way, if the CPU 110 determines that the composition of the captured image is similar to the recommended composition in the predetermined direction, the CPU 110 displays animation of the recommended composition frame Fs so that it can be drawn to the state where the recommended composition frame Fs and the captured image composition frame Ft are fit to each other in this direction. After that, the CPU 110 fixes and displays the recommended composition frame Fs in the state where the display is being changed.

Therefore, the DSC 100 can display the recommended composition frame Fs on the position where the recommended composition frame Fs can be completely fit to the captured image composition frame Ft. Thus, the user is allowed to recognize that the composition of the captured image is fit to the recommended composition in this direction.

Therefore, even if the composition of the captured image is slightly moved in the certain direction, the user can recognize that the composition of the captured image is fit to the recommended composition in this direction. Therefore, the DSC 100 can reduce a difficulty of the user's operation for fitting the composition of the captured image to the recommended composition and make the user difficult to feel that the composition of the captured image hardly fit to the recommended composition.

Furthermore, even if the composition of the captured image is slightly moved by shaking of user's hand that holds the case 101, the DSC 100 allows the user to prevent the composition of the captured image from being displaced from the position where the recommended composition frame Fs is fit to the captured image composition frame Ft as long as the composition of the captured image is similar to the recommended composition. Therefore, the user can address the operation of fitting the composition of the captured image to the recommended composition in every direction without paying attention to preventing the composition of the captured image from the recommended composition in different directions.

According to the above configuration of the DSC 100, the DSC 100 can display a captured mode screen SG on the liquid crystal panel 115, where the captured mode screen SG displays a captured image, a recommended composition frame Fs that represents a recommended composition while representing a subject in the captured image, and a captured image composition frame Ft. Then, the DSC 100 displays animation of the recommended composition frame Fs so that it can be drawn to the captured image composition frame Ft when the composition of the captured image is similar to the recommended composition. Subsequently, the DSC 100 fixes and displays the recommended composition frame Fs in the state where the recommended composition frame Fs is drawn to.

Therefore, the DSC 100 can present the user the recommended composition. In addition, even if the composition of the captured image is slightly moved, the user can recognize that the composition of the captured image corresponds to the recommended composition as long as the composition of the captured image is similar to the recommended composition. Therefore, the DSC 100 can reduce a difficulty of the user's operation for fitting the composition of the captured image to the recommended composition and make the user difficult to feel that the composition of the captured image hardly fit to the recommended composition. Therefore, the DSC 100 can reduce burden on the user in user's operation to fit the composition of the captured image to the recommended composition, leading to a reduced burden on the user.

2. Other Embodiments 2-1. Another Embodiment 1

In the aforementioned embodiment, a recommended composition frame Fs that represents a recommended composition while representing a subject and a captured image composition frame Ft that represents the composition of a captured image are represented to allow the user to carry out the operation of fitting the recommended composition frame Fs to the captured image composition frame Ft.

The configuration of the DSC 100 is not limited to one described in the above embodiment. Alternatively, for example, the DSC 100 may display a subject frame that represents the position of a subject in the composition of a current captured image and a recommended composition subject frame that represents the position of the photographic subject in the recommended composition. Then, the DSC 100 may allow the user to carry out the operation of fitting the subject to the recommended composition subject frame.

Figure 12A:
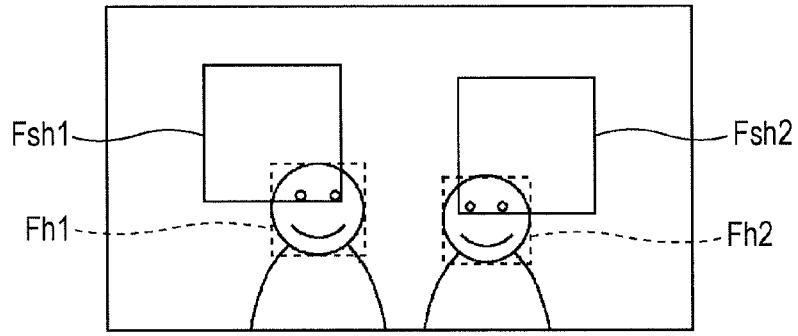
FIG. 12 is a schematic diagram illustrating a display example (1) of a subject frame and a recommended composition subject frame.

Specifically, for example, if the CPU 110 recognizes two or more personal faces as subjects as a result of subject recognition, subject frames Fh (Fh1 to Fh2) that represent portions recognized as the respective faces are displayed on a through-the-lens image Tp as shown in FIG. 12A.

At this time, the CPU 110 detects the recommended compositions of the respective subjects based on the results of the subject recognition and displays recommended composition subject frames Fsh (Fsh1 to Fsh2) that represent the subjects (here, personal faces) in the recommended compositions on the through-the-lens image Tp.

Therefore, the DSC 100 can allow the user to recognize that the composition of the captured image can be fit to the recommended composition by fitting the subject frame Fh to the recommended composition subject frame Fsh.

In this way, if the subject frame Fh and the recommended composition subject frame Fsh are displayed, the CPU 110 detects the amount of displacement between the subject frame Fh and the corresponding recommended composition subject frame Fsh at every predetermined time interval. In a manner similar to the aforementioned embodiment, for example, the CPU 110 detects the amount of displacement between the subject frame Fh and the recommended composition subject frame Fsh in each of the pan, tilt, zoom, and rotation directions.

Figure 12B:
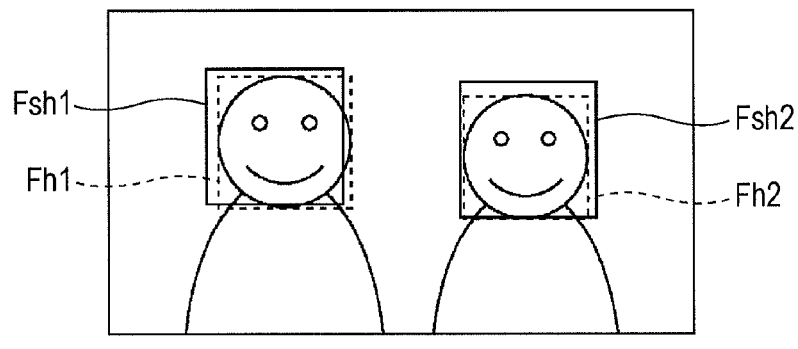
Figure 12B:
Figure 12B:
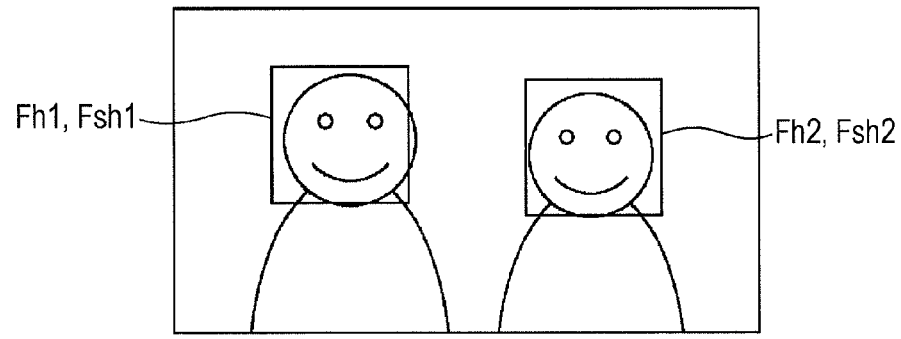

Subsequently, for example, if the CPU 110 determines that the amount of displacement in each of all the directions, the CPU 110 determines that the subject frame Fh is substantially fit to the recommended composition subject frame Fsh, or similar thereto. At this time, as shown in FIG. 12B, the CPU 110 displays animation of the subject frame Fh so that it can be drawn to the recommended composition subject frame Fsh. Then, the CPU 110 fixes and displays the subject frame Fh on the recommended composition subject frame Fsh.

Subsequently, if the amount of displacement between the subject frame (not shown in practice) and the recommended composition subject frame Fsh when the subject is fixed on the subject frame is not more than a predetermined threshold, the subject is fixed and displayed on the recommended composition subject frame Fsh instead of fixing the subject on the subject frame Fh.

In other words, even if the composition of the captured image is slightly displaced, the CPU 110 displays the subject frame Fh as if the subject frame Fh is absorbed on the recommended composition subject frame Fsh. Here, if two or more subjects are recognized, the CPU 110 is designed to carry out for every subject frame Fh a process of fixing and displaying the subject frame Fh on the recommended composition subject frame Fsh.

By the way, if the DSC 100 recognizes two or more subjects, it takes much time to simultaneously fit two or more subject frames Fh to the respective recommended composition subject frames Fsh when the display of the subject frames Fh is carried out only by representing the positions of the respective subjects. In this case, a large burden is placed on the user.

However, according to the DSC 100 of the present embodiment, even if the composition of the captured image is slightly moved by user's hand shaking or the like, the user can continuously recognize that the subject frame Fh is fit to the recommended composition subject frame Fsh because the subject frame Fh is fixed on the recommended composition subject frame Fsh. Therefore, the DSC 100 can prevent the user from feeling that the subject frame Fh is readily displaced from the recommended composition subject frame Fsh, leading to a more reduction in burden on the user.

However, it is not limited to such a configuration of the DSC 100. Alternatively, the DSC 100 may recognize a code (e.g., a one-dimensional code or a two-dimensional code) as a subject and then displays both the subject frame that represents the position of the code in the composition of the current captured image and a recommended composition subject frame that represents the position of the code in the recommended composition.

In this case, for example, the DSC100 is designed to recognize a predetermined two-dimensional code. This two-dimensional code may include, for example, a plurality of white and black cells in matrix. Any kind of information is represented by the patterns of white cells and black cells.

If the CPU 110 recognizes that the shape of a subject corresponds to the arrangement of white and black cells in matrix, the CPU 110 recognizes that the subject is a predetermined two-dimensional code.

Figure 13A:
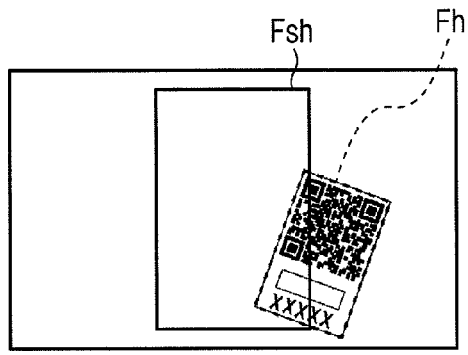
FIG. 13 is a schematic diagram illustrating display example (2) of a subject frame and a recommended composition subject frame.

Then, the CPU 110 detects a composition captured in size where a two-dimensional code is decodable as a recommended composition. Subsequently, as shown in FIG. 13A, the CPU 110 displays a recommended composition subject frame Fsh, which represents the position and the size of the two-dimensional code in the recommended composition, on a through-the-lens image Tp.

In addition, the CPU 110 displays a subject frame Fh on the through-the-lens image Tp, where the subject frame Fh represents the position and the size of the current two-dimensional code.

Therefore, the DSC 100 can allow the user to recognize that the composition of the captured image can be fit to the recommended composition by fitting the subject frame Fh to the recommended composition subject frame Fsh.

Figure 13B:
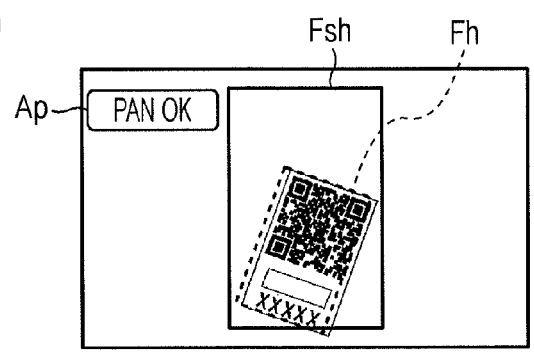

In addition, for example, in a manner similar to the aforementioned embodiment, the CPU 110 determines whether the subject frame Fh and the recommended composition subject frame Fsh are substantially fit to each other in the pan direction, or similar to each other. At this time, if it is determined that the subject frame Fh and the recommended composition subject frame Fsh are similar to each other in the pan direction as shown in FIG. 13B, the CPU 110 fixes and displays the subject frame Fh on the recommended composition subject frame Fsh in the pan direction instead of fixing on the subject (code).

At this time, the CPU 110 may display an icon Ap on the through-the-like image Tp, where the icon Ap represents that the subject frame Fh is similar to the recommended composition subject frame Fsh in the pan direction.

Figure 13C:
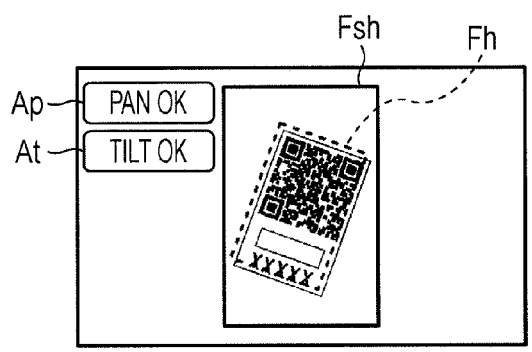

In addition, for example, in a manner similar to the aforementioned embodiment, the CPU 110 determines whether the subject frame Fh and the recommended composition subject frame Fsh are substantially fit to each other in the tilt direction, or similar to each other. At this time, if it is determined that the subject frame Fh and the recommended composition subject frame Fsh are similar to each other in the tilt direction as shown in FIG. 13C, the CPU 110 fixes and displays the subject frame Fh on the recommended composition subject frame Fsh in the tilt direction instead of fixing on the subject (code).

Furthermore, the CPU 110 may display an icon At on the through-the-like image Tp, where the icon At represents that the subject frame Fh is similar to the recommended composition subject frame Fsh in the tilt direction.

Figure 13D:
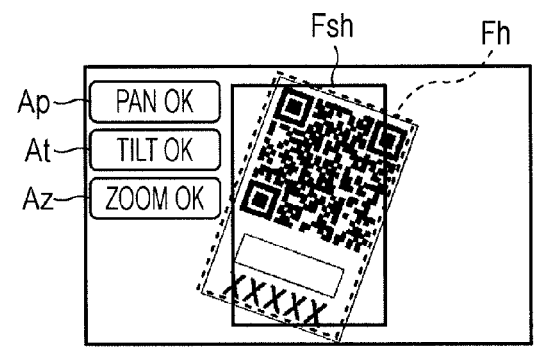

In addition, for example, in a manner similar to the aforementioned embodiment, the CPU 110 determines whether the subject frame Fh and the recommended composition subject frame Fsh are substantially fit to each other in the zoom direction, or similar to each other. At this time, if the CPU 110 determines that the subject frame Fh and the recommended composition subject frame Fsh are similar to each other in the zoom direction, as shown in FIG. 13D, the CPU 110 displays the subject frame Fh as if the subject frame Fh is absorbed on a frame of the same size as that of the recommended composition subject frame Fsh instead of fixing on the subject (code). In other words, the CPU 110 fixes and displays the subject frame Fh in a state of being fit to the recommended composition subject frame Fsh in the zoom direction.

Furthermore, the CPU 110 may display an icon Az on the through-the-like image Tp, where the icon Az represents that the subject frame Fh is similar to the recommended composition subject frame Fsh in the zoom direction.

Figure 13E:
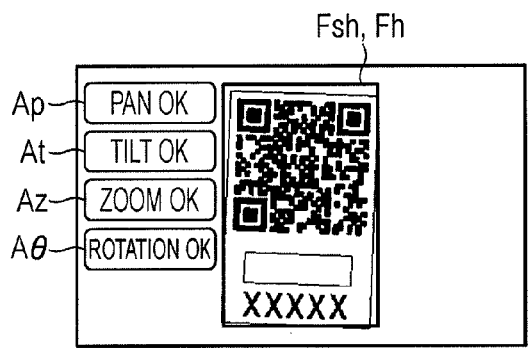

In addition, for example, in a manner similar to the aforementioned embodiment, the CPU 110 determines whether the subject frame Fh and the recommended composition subject frame Fsh are substantially fit to each other in the rotation direction, or similar to each other. At this time, if it is determined that the subject frame Fh and the recommended composition subject frame Fsh are similar to each other in the rotation direction as shown in FIG. 13E, the CPU 110 displays the subject frame Fh on the recommended composition subject frame Fsh as if it is absorbed on a frame in parallel with the recommended composition subject frame Fsh in instead of fixing on the subject (code). In other words, the CPU 110 fixes and displays the subject frame Fh in a state of being fit to the recommended composition subject frame Fsh in the rotation direction.

Furthermore, the CPU 110 may display an icon Az on the through-the-like image Tp, where the icon Aθ represents that the subject frame Fh is similar to the recommended composition subject frame Fsh in the rotation direction.

In this way, the DSC 100 displays an icon that represents that the subject frame Fh and the recommended composition subject frame Fsh are similar to each other in each of the direction to allow the user to recognize how much the subject frame Fh is fit to the recommended composition subject frame Fsh. Therefore, the DSC 100 can recognize how much the operation is carried out to fit the composition of the captured image to the recommended composition, leading to a reduction in burden on the user.

The configuration of the CPU 110 is not limited to one described above. Alternatively, the CPU 110 may display icons that represent the respective directions in addition to display both the subject frame Fh and the recommended composition subject frame Fsh when the shutter button 106 is half-pressed.

For example, if the CPU 110 determines that the subject frame Fh and the recommended composition subject frame Fsh are similar to each other in the pan direction, the CPU 110 may hind the icon that represents the pan direction. In other words, if the CPU 110 determines that the subject frame Fh and the recommended composition subject frame Fsh are similar to each other in an arbitrary direction, the CPU 110 may hind the icon that represents such a direction.

2-2. Another Embodiment 2

In the aforementioned embodiment, when the shutter button 106 is half-pressed, the recommended composition frame Fs is displayed on the imaging mode screen SG to present the recommended composition to the user.

However, the configuration of the CPU 110 is not limited to one described in the aforementioned embodiment. Alternatively, the CPU 110 may display guide information on the imaging mode screen SG. In this case, the guide information is provided for guiding the user to carry out an operation of fitting the recommended composition frame Fs to the captured image composition frame Ft, or an operation of fitting the composition of a captured image to the recommended composition.

For example, the CPU 110 may display a message, an arrow, or the like to instruct how the case 101 is moved to fit the recommended composition frame Fs to the captured image composition frame Ft.

Alternatively, for example, the CPU 110 may display animation of the path of the recommended composition frame Fs when the composition of a captured image is changed until it corresponds to the recommended composition, or the path of the recommended composition frame Fs when the recommended composition frame Fs is changed until it corresponds to the captured image composition frame Ft. At this time, for example, the CPU 110 may display the corresponding path with a light color to prevent the through-the-lens image Tp from being invisible.

Furthermore, for example, if the recommended composition frame Fs moves to a position outside the captured image composition frame Ft, the CPU 110 may display a guide icon Ui that represents how to move the recommended composition frame Fs to return it into the captured image composition frame Ft. In other words, the guide icon Ui represents the way of movement to bring the composition of the captured image close to the recommended composition.

Figure 14:
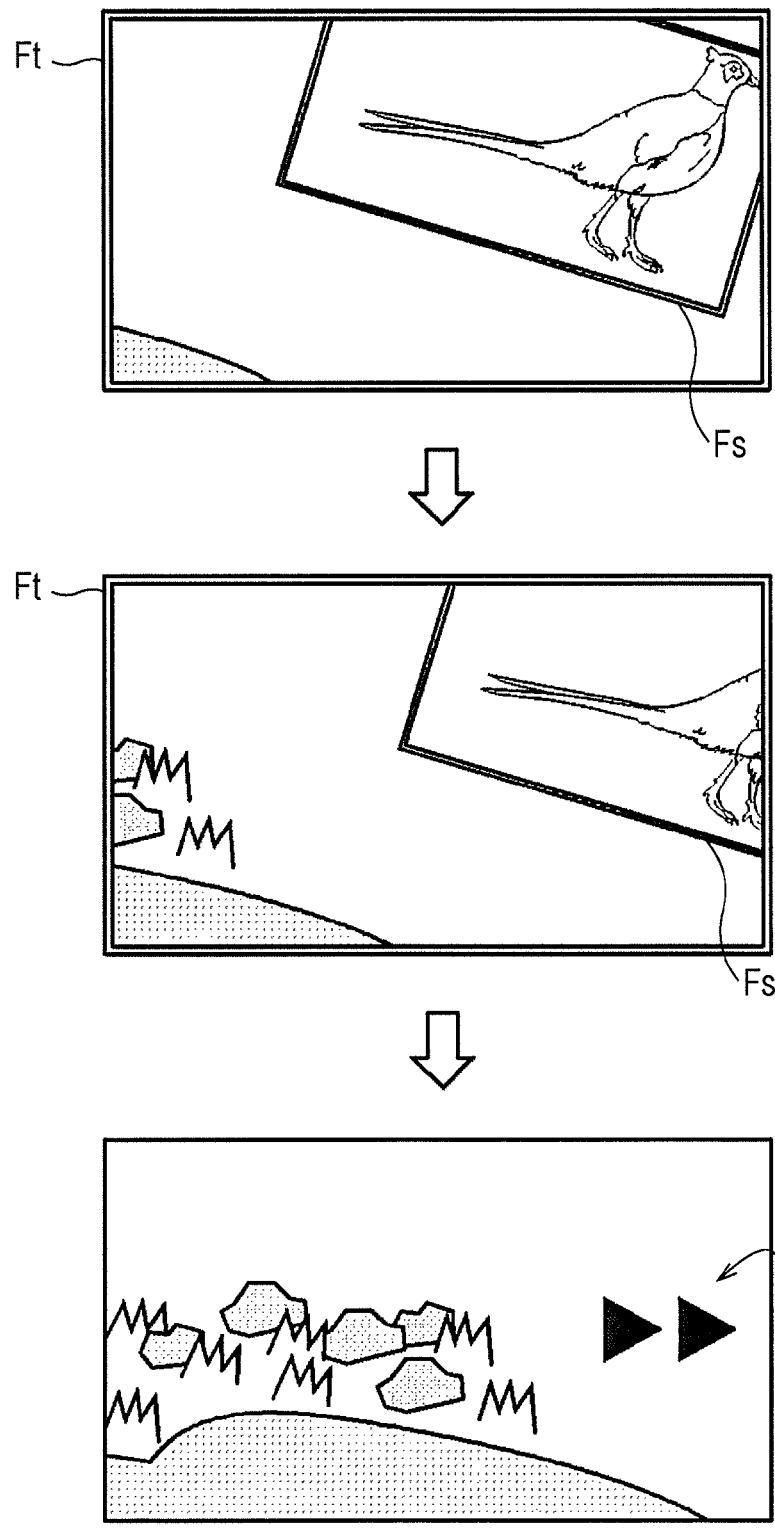
FIG. 14 is a schematic diagram illustrating a display example of a guide icon.

FIG. 14 is a diagram illustrating an example in which the CUP 110 generates the display of a guide icon Ui, which represents the rightward direction, because the subject An moves out of the captured image composition frame Ft as a result of the movement of the subject An rightward.

In this case, based on the subject recognition information sent from the digital signal processing unit 123, the CPU 110 detects the direction of which the subject moves to detect how the recommended composition frame Fs moves.

2-3. Another Embodiment 3

In the aforementioned embodiment, if the CPU 110 determines that the composition of a captured image is similar to the recommended composition, the CPU 110 displays animation of the recommended composition frame Fs so that it can be drawn to the captured image composition frame Ft. During that the composition of the captured image is similar to the recommended composition, the CPU 110 fixes and displays the recommended composition frame Fs in the state where the recommended composition frame Fs is drawn to the captured image composition frame Ft.

The configuration of the CPU 110 is not limited to one described above. Alternatively, for example, if it is determined that the composition of the captured image is similar to the recommended composition, the CPU 110 may change the display of the recommended composition frame Fs into any of various configurations, such as a change in color or blink of the recommended composition frame Fs. During that the composition of the captured image is similar to the recommended composition, the CPU 110 may display the recommended composition frame Fs while the display of the recommended composition frame Fs is being changed.

Furthermore, for example, the CPU 110 displays the recommended composition frame Fs and captured image composition frame Ft in different colors. If it is determined that the composition of a captured image is similar to the recommended composition, the CPU 110 may fit the color of the recommended composition frame Fs to the color of the captured image composition frame Ft.

2-4. Another Embodiment 4

In the aforementioned embodiment, if the amount of displacement between the configuration of the captured image and the recommended configuration is calculated and such an amount of displacement is not more than a predetermined threshold, the CPU 110 displays animation of the recommended composition frame Fs so that it can be drawn to the captured image composition frame Ft.

The configuration of the CPU 110 is not limited to one described in the above embodiment. Alternatively, the CPU 110 may change the color of the recommended composition frame Fs depending on the amount of displacement between the composition of the captured image and the recommended composition.

For example, the CPU 110 may generate the display of the recommended composition frame Fs and the captured image composition frame Ft in different colors, so that a decrease in amount of displacement between the composition of the captured image and the recommended composition may lead to bring the color of the recommended composition frame Fs close to the color of the captured image composition frame Ft. In other words, the CPU 110 may bring the color of the recommended composition frame Fs close to the color of the captured image composition frame Ft in proportion to an increase in similarity between the composition of the captured image and the recommended composition.

Furthermore, for example, when calculating the amount of displacement between the composition of the captured image and the recommended composition in each direction, the CPU 110 may change the color of the recommended composition frame Fs depending on the number of the directions where the amount of displacement is not more than a predetermined threshold. In other words, the CPU 110 may change the color of the recommended composition frame Fs depending on the number of the directions where the composition of the captured image and the recommended composition are similar to each other.

Therefore, the DSC 100 can allow the user to recognize how much the configuration of the captured image and the recommended composition are fit to each other. Therefore, the DSC 100 can recognize how much the operation is desired for fitting the composition of the captured image to the recommended composition, leading to a decrease in burden on the user.

2-5. Another Embodiment 5

In the aforementioned embodiment, if the CPU 110 determines that the composition of a captured image is similar to the recommended composition, the CPU 110 displays animation of the recommended composition frame Fs so that it can be drawn to the captured image composition frame Ft. After that, the recommended composition frame Fs is fixed and displayed.

The configuration of the CPU 110 is not limited to one described above. Alternatively, for example, if it is determined that the composition of the captured image is similar to the recommended composition, the CPU 110 may notify the user of a change in display of the recommended composition frame Fs as well as similarity between the composition of the captured image and the recommended composition by any of ways or operations different from the display change.

For example, if the CPU 110 determines that the composition of the captured image is similar to the recommended composition, the CPU 110 may output any sound (e.g., a sound effect or a message) from a speaker (not shown) to notify the user of the fact that the composition of the captured image is similar to the recommended composition.

Furthermore, if the CPU 110 determines that the composition of the captured image is similar to the recommended composition, the CPU 110 may allow the case 101 of the DSC 100 to be vibrated. In this case, the DSC 100 is provided with a vibration unit (not shown) for vibrating the case 101.

2-6. Another Embodiment 6

In the aforementioned embodiment, furthermore, the CPU 110 is designed to record a captured image on the recording unit 124 when the shutter button 106 is completely pressed. Here, at this time, the captured image is represented as a through-the-lens image Tp.

The configuration of the CPU 110 is not limited to one described above. Alternatively, for example, if it is determined that the composition of the captured image is similar to the recommended composition, the CPU 110 may record a captured image on the recording unit 124 when the shutter button 106 is completely pressed. In other words, the CPU 110 may automatically release the shutter if the CPU 110 determines that the composition of the captured image is similar to the recommended composition.

Therefore, the DSC 100 can record a captured image provided as a recommended composition on the recording unit 124 without compelling the user to completely press the shutter button 106. Thus, a subject can be captured with the recommended composition.

2-7. Another Embodiment 7

In the aforementioned embodiment, furthermore, the CPU 110 is designed to display the captured image composition frame Ft together with the recommended composition frame Fs when the shutter button is half-pressed. The configuration of the CPU 110 is not limited to one described above. Alternatively, the CPU 110 may not display the captured image composition frame Ft.

In this case, the DSC 100 can allow the user to fit the recommended composition frame Fs to the edge of the through-the-lens image Tp, thereby fitting the composition of a captured image to the recommended composition.

In this case, furthermore, if it is determined that the composition of the captured image is similar to the recommended composition, the CPU 110 may display animation of the recommended composition frame Fs so that it may be drawn to the edge of the through-the-lens image Tp. Therefore, the CPU 110 may display the recommended composition frame Fs after fixing it on the edge of the through-the-lens image tp.

2-8. Another Embodiment 8

In the aforementioned embodiment, if the CPU 110 determines that the composition of a captured image is similar to the recommended composition in each of the predetermined directions (pan, tilt, zoom, and rotation directions), the CPU 110 fixes and displays the recommended composition frame Fs on the captured image composition frame Ft.

The configuration of the CPU 110 is not limited to one described above. Alternatively, for example, if it is determined that the composition of the captured image is similar to the recommended composition in the zoom direction, the CPU 110 may fix and display the recommended composition frame Fs on the captured image composition frame Ft in each of all the directions in addition to the zoom direction.

The configuration of the CPU 110 is not limited to one described above. Alternatively, for example, if it is determined that the composition of the captured image is similar to the recommended composition in arbitrary two among all the directions, the CPU 110 may conclude that the composition of the captured image is similar to the recommended composition. Thus, the recommended composition frame Fs may be fixed and displayed on the captured image composition frame Ft in all the directions.

2-9. Another Embodiment 9

Furthermore, in the aforementioned embodiment, the CPU 110 previously determines a first threshold and a second threshold for determining the similarity between the composition of a captured image and the recommended composition in each of the directions based on the range of possible displacement to be caused when the user holds the case 101.

The configuration of the CPU 110 is not limited to one described above. Alternatively, for example, the first threshold and the second threshold may be dynamically changed in each of the directions depending on the user's operation.

In this case, for example, the DSC 100 may be provided with a sensor, such as an acceleration sensor, which measures the inclination of the case 101, such as an acceleration sensor. The CPU 110 may display a message on the liquid crystal panel 115, where the message is provided for instructing the user to hold the case 101 in stationary state. Then, the CPU 110 may detect the range of change in inclination of the case 101 during the period of displaying the message and recognize such a range of change as a range of displacement when the user holds the case 101.

The CPU 110 defines the first and second thresholds in each of the directions based on the recognized displacement range to determine that the composition of the captured image and the recommended composition are similar to each other as long as the displacement between the composition of the captured image and the recommended composition is within the recognized displacement range.

Therefore, the DSC 100 can determine the conditions for determining whether the composition of a captured image and the recommended composition are similar to each other so that the conditions can be fit to individual users. Therefore, the DSC 100 can allow the user to more effectively avoid the displacement of the recommend composition frame Fs when the composition of the captured image is moved without user's interest. Therefore, a difficulty in user's operation to fit the composition of the captured image to the recommended composition can be further reduced.

Furthermore, the conditions are not only limited to those in consideration of the range of possible displacement to be caused when the user holds the case 101. Alternatively, the DSC 100 may perform the determination of whether the composition of a captured image and the recommended composition under any of various other conditions.

For example, the DSC 100 may determine that the composition of a captured image is similar to the recommended composition when the ratio of the amount of displacement between the composition of the captured image and the recommended composition to the composition of the composition of the captured image is not more than a predetermined level (e.g., 10%).

Furthermore, in the fixed display processing of the aforementioned embodiment, the CPU 110 defines the first and second thresholds so that the second threshold for hiding the fixed display is higher than the first threshold for starting the fixed display of the recommended composition frame Fs on the through-the-lens image Tp.

The configuration of the CPU 110 is not limited to one described above. Alternatively, for example, the CPU 110 may define any of various other thresholds in fixed display of the recommended composition frame Fs and in hiding thereof as long as the composition of the captured image and the recommended composition can be considered similar.

2-10. Another Embodiment 10

Furthermore, in the aforementioned embodiment, the CPU 110 is designed to detect the recommended composition of a subject based on the result of the subject recognition.

The configuration of the CPU 110 is not limited to one described above. Alternatively, for example, the CPU 110 may acquire recommended composition data that represents the recommended composition of a subject from an external apparatus, such as a server, on a network.

In this case, the CPU 110 acquires information about the actual position (current position information) of the DSC 100 via a global positioning system (GPS) module (not shown). In addition, the CPU 110 acquires information about shooting direction (current direction information), representing an actual direction along which the lens is directed to of the DSC 100 from a direction sensor (not shown).

Subsequently, the CPU 110 sends the current position information, the current direction information, and a request of acquiring recommended composition data to an external server (not shown) for providing recommended composition via a communication interface (not shown). As a result, the CPU 110 receives recommended composition data that represents a recommended composition from the server with respect to the current position and the shooting direction.

Furthermore, the CPU 110 generates the recommended composition frame Fs on the basis of the received recommended composition data and the subject recognition information obtained from the result of the subject recognition and then displays the resulting recommended composition frame Fs on the through-the-lens image Tp.

2-11. Another Embodiment 11

Furthermore, in the aforementioned embodiment, the DSC 100 provided as an information processing apparatus 1 includes the digital signal processing unit 123, which serves as the captured image acquisition unit 2 and the subject recognition unit 3, and the CPU 110, which serves as the captured image acquisition unit 4 and the control unit 5.

The configuration of the DSC 100 is not limited to one described above. Alternatively, for example, each functional section of the above DSC 100 may be constructed of any of various kinds of other hardware or software.

For example, the DSC 100 may include a captured image acquisition unit that acquires captured image data from an external image pickup apparatus connected with the DSC 100 instead of the digital signal processing unit 123 that acquires the captured image data through the lens unit 118 and the imaging device 120. In this case, the DSC 100 is provided with a communication interface for connecting with an external apparatus.

Furthermore, for example, the DSC 100 may include a liquid crystal display with a touch panel function instead of the touch screen 109 constructed of the liquid crystal panel 115 and the touch panel 113. Alternatively, instead of the touch panel 113, a hardware button, such as a cross key, may be provided. Furthermore, instead of the liquid crystal panel 115, an organic electro luminescence (EL) display may be provided.

Furthermore, any of the aforementioned embodiments is applied to the DSC 100. However, the information processing apparatus is not limited to such a DSC 100. Alternatively, any information processing apparatus is available as long as it acquires captured image data. Examples of such an apparatus include a digital vide camera, a personal computer, and a cellular phone. Furthermore, any embodiment of the present invention may be applied to or can be applied to any of various other information processing apparatuses.

2-12. Another Embodiment 12

Furthermore, in the aforementioned embodiment, programs for executing various kinds of processing are written in the ROM 111 of the DSC 100.

However, it is not limited to such a storage. Alternatively, for example, any program may be stored in a storage medium, such as a memory card. Then, the CPU 110 of the DSC 100 may read out and execute the program from the storage medium. In addition, the DSC 100 may install any program read out from the storage medium into the flash memory 125.

2-13. Another Embodiment 13

Furthermore, the present invention is not limited to any of the above embodiments and other embodiments. In other words, the present invention is applicable to any combination of the above embodiments and other embodiments at least partially or entirely or applicable to the form made of part extracted therefrom. For example, the configuration of another embodiment 1 may be combined with the configuration of another embodiment 2.

The present application contains subject matter related to that disclosed in Japanese Priority Patent Application JP 2009-238467 filed in the Japan Patent Office on Oct. 15, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a captured image acquisition unit that acquires captured image data;
    a subject recognition unit that recognizes a subject of a captured image based on said captured image data;
    a recommended composition acquisition unit that acquires recommended composition data representing a recommended composition of said subject; and
    a control unit that allows a display unit to display a screen including said captured image, a frame representing said subject, and information about said recommended composition, causes a simultaneous change in displacement, rotation, or size of said frame corresponding to a change in said subject, and fixes and displays said frame on said screen when the composition of said captured image is similar to said recommended composition, wherein said control unit displays said screen on said display unit when recognizing that a shooting preparation is carried out through an operation unit, where said screen includes said frame and information about said recommended composition, wherein
    said frame representing said subject serves as a recommended composition frame based on said information about said recommended composition;
    said screen includes an area out of said recommended composition frame and the brightness of said area is lowered; and
    said brightness of said area out of said recommended composition frame is restored to a previous level after passing a predetermined time from the display of said recommended composition frame.

2. The information processing apparatus according to claim 1, wherein
    said control unit allows said display unit to display said screen including said captured image, said recommended composition frame, and a captured image composition frame representing the composition of said captured image, causes a simultaneous change in displacement, rotation, or size of said recommended composition frame corresponding to a change in said subject, and fixes and displays said recommended composition frame on said captured image composition frame when the composition of said captured image is similar to said recommended composition.

3. The information processing apparatus according to claim 1, wherein
    said control unit causes a simultaneous change in displacement, rotation, or size of said recommended composition frame corresponding to a change in said subject, and fixes and displays said recommended composition frame on the edge of said captured image when the composition of said captured image is similar to said recommended composition.

4. The information processing apparatus according to claim 1, wherein
    said control unit allows said display unit to display said screen including said frame representing said subject and said recommended composition frame as information that represents said recommended composition, causes a simultaneous change in displacement, rotation, or size of said recommended composition frame corresponding to a change in said subject, and fixes and displays said frame representing said subject on said recommended composition frame when the composition of said captured image is similar to said recommended composition.

5. The information processing apparatus according to claim 1, wherein
    said control unit fixes and displays said frame in a predetermined direction of said captured image when it is determined that the composition of said captured image is similar to said recommended composition in said direction.

6. The information processing apparatus according to claim 5, wherein
    said predetermined direction of said captured image is at least one of a pan direction, a tilt direction, a zoom direction, and a rotation direction.

7. The information processing apparatus according to claim 1, wherein
    said control unit displays said screen on said display unit, where said screen also includes guide information for guiding a user's operation of fitting the composition of said captured image to said recommended composition.

8. The information processing apparatus, according to claim 7, wherein
    said guide information is a movement path of said frame that starts from the display of said frame and ends when the composition of said captured image is similar to said recommended composition.

9. The information processing apparatus according to claim 1, wherein:
    said control unit determines that the composition of said captured image is similar to said recommended composition when a displacement of said captured image to said recommended composition is not more than a predetermined first threshold, and fixes and displays said frame being changed on said screen; and
    said control unit determines that the composition of said captured image is not similar to said recommended composition when a displacement of said captured image to said recommended composition is equal to or more than a predetermined first threshold, which is larger than a predetermined second threshold, and cancels the fixation of said frame.

10. The information processing apparatus according to claim 1, wherein
    said control unit changes the color of said frame when the composition of said captured image is similar to said recommended composition, and fixes and displays said frame with changed color.

11. The information processing apparatus according to claim 1, wherein
    said control unit causes a change in display of said frame depending on a displacement of said captured image to said recommended composition.

12. The information processing apparatus according to claim 1, wherein
    said control unit notifies that the composition of said captured image is similar to said recommended composition by operation different from fixing and displaying said frame when the composition of said captured image is similar to said recommended composition.

13. The information processing apparatus according to claim 1, wherein
said control unit records said captured image on a predetermined storage medium when the composition of said captured image is similar to said recommended composition.

14. A display control method, comprising:
acquiring captured image data;
recognizing a subject of a captured image based on said captured image data;
acquiring recommended composition data that represents recommended composition about said subject;
displaying on a display unit a screen that includes said captured image, a frame representing said subject, and information about said recommended composition;
causing a simultaneous change in displacement, rotation, or size of said frame corresponding to a change in said subject; and
fixing and displaying said frame on said screen when the composition of said captured image is similar to said recommended composition, wherein said displaying said screen on said display unit is performed when recognizing that a shooting preparation is carried out through an operation unit, where said screen includes said frame and information about said recommended composition, wherein
said frame representing said subject serves as a recommended composition frame based on said information about said recommended composition;
said screen includes an area out of said recommended composition frame and the brightness of said area is lowered; and
said brightness of said area out of said recommended composition frame is restored to a previous level after passing a predetermined time from the display of said recommended composition frame.

15. A non-transitory, computer-readable storage medium storing a computer program that, when executed by an information processing apparatus, causes the information processing apparatus to perform a method, the method comprising:
acquiring captured image data;
recognizing a subject of a captured image based on said captured image data;
acquiring recommended composition data that represents a recommended composition of said subject;
displaying a screen including said captured image, a frame of said subject, and information about said recommended composition on a display unit; and
causing a simultaneous change in displacement, rotation, or size of said frame corresponding to a change in said subject; and
fixing and displaying said frame on said screen when the composition of said captured image is similar to said recommended composition, wherein said displaying said screen is performed when recognizing that a shooting preparation is carried out through an operation unit, where said screen includes said frame and information about said recommended composition, wherein
said frame representing said subject serves as a recommended composition frame based on said information about said recommended composition;
said screen includes an area out of said recommended composition frame and the brightness of said area is lowered; and
said brightness of said area out of said recommended composition frame is restored to a previous level after passing a predetermined time from the display of said recommended composition frame.

* * * * *